US011818739B2

(12) United States Patent
Raghavan et al.

(10) Patent No.: US 11,818,739 B2
(45) Date of Patent: Nov. 14, 2023

(54) METHODS FOR SELF-INTERFERENCE AND CROSS-LINK INTERFERENCE MEASUREMENTS IN MILLIMETER WAVE BANDS

(71) Applicant: QUALCOMM Incorporated, San Diego, CA (US)

(72) Inventors: Vasanthan Raghavan, West Windsor Township, NJ (US); Alexander Dorosenco, El Cajon, CA (US); Tao Luo, San Diego, CA (US); Robert Douglas, San Diego, CA (US); Jeremy Darren Dunworth, La Jolla, CA (US); Junyi Li, Franklin Park, NJ (US); Allen Minh-Triet Tran, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 290 days.

(21) Appl. No.: 17/224,004

(22) Filed: Apr. 6, 2021

(65) Prior Publication Data

US 2021/0321415 A1    Oct. 14, 2021

Related U.S. Application Data

(60) Provisional application No. 63/009,236, filed on Apr. 13, 2020.

(51) Int. Cl.
*H04W 72/541* (2023.01)
*H04W 72/0446* (2023.01)
(Continued)

(52) U.S. Cl.
CPC ..... *H04W 72/541* (2023.01); *H04L 27/26025* (2021.01); *H04W 24/10* (2013.01); *H04W 72/0446* (2013.01); *H04W 72/0453* (2013.01)

(58) Field of Classification Search
CPC ............... H04W 72/082; H04W 24/10; H04W 72/0446; H04W 72/0453; H04W 52/243;
(Continued)

(56) References Cited

U.S. PATENT DOCUMENTS

| 10,841,914 | B2* | 11/2020 | Liou ................. H04L 5/0094 |
| 2018/0035416 | A1* | 2/2018 | Yi .................... H04L 5/0037 |
| 2020/0092739 | A1* | 3/2020 | Yang ................. H04L 5/0057 |
| 2020/0367120 | A1 | 11/2020 | Ma et al. |
| 2021/0067992 | A1 | 3/2021 | Kusashima et al. |

FOREIGN PATENT DOCUMENTS

| WO | WO-2019142512 A1 | 7/2019 |
| WO | WO-2019154350 A1 | 8/2019 |

OTHER PUBLICATIONS

International Search Report and Written Opinion—PCT/US2021/026154—ISA/EPO—dated Jul. 5, 2021 (202606WO).

(Continued)

*Primary Examiner* — Chi H Pham
*Assistant Examiner* — Raul Rivas
(74) *Attorney, Agent, or Firm* — Holland & Hart LLP

(57) ABSTRACT

Methods, systems, and devices for wireless communications are described for self-interference or cross-link interference measurements at a user equipment (UE). A UE may receive configuration information from a base station that indicates one or more slot format index (SFI) values that are compatible for cross-link interference or self-interference measurements. Based on the configured SFI(s), the UE may measure interference in multiple symbols, which may be used to estimate an amount of cross-link interference or self-interference, and the UE may transmit a measurement report to the base station. The base station, based on the measurement report, may identify one or more compatible SFIs, beam pairs, or combinations thereof, for subsequent communications with one or more UEs. The interference measurements may identify cross-link interference at the UE (Continued)

that results from transmissions of a different UE, or may identify self-interference of concurrent communications of multiple channels at a same UE.

26 Claims, 17 Drawing Sheets

(51) Int. Cl.
*H04L 27/26* (2006.01)
*H04W 24/10* (2009.01)
*H04W 72/0453* (2023.01)

(58) Field of Classification Search
CPC ............ H04L 27/26025; H04L 5/0092; H04B 7/0456; H04B 7/0695; H04B 17/345
See application file for complete search history.

(56) References Cited

OTHER PUBLICATIONS

Qualcomm Incorporated: "On RSSI and Channel Occupancy Measurements in NR-U", 3GPP Draft, 3GPP TSG-RAN WG4 Meeting #92-Bis, R4-1912359, on RSSI and Channel Occupancy Measurements in NR-U, 3rd Generation Partnership Project (3GPP), Mobile Competence Centre, 650, Route Des Lucioles, F-06921 Sophia-Antipolis Cedex, France, vol. RAN WG4, No. Chongqing, China, Oct. 14, 2019-Oct. 18, 2019, Oct. 4, 2019 (Oct. 4, 2019), XP051807086, 7 Pages, Retrieved from the Internet: URL: https://ftp.3gpp.org/tsg_ran/WG4_Radio/TSGR4_92Bis/Docs/R4-1912359.zip. R4-1912359, on RSSI and Channel Occupancy Measurements in NR-U.docx [retrieved on Oct. 4, 2019] section 3.

* cited by examiner

METHODS FOR SELF-INTERFERENCE AND CROSS-LINK INTERFERENCE MEASUREMENTS IN MILLIMETER WAVE BANDS

CROSS REFERENCE

The present Application for Patent claims the benefit of U.S. Provisional Patent Application No. 63/009,236 by RAGHAVAN et al., entitled "METHODS FOR SELF-INTERFERENCE AND CROSS-LINK INTERFERENCE MEASUREMENTS IN MILLIMETER WAVE BANDS," filed Apr. 13, 2020, assigned to the assignee hereof, and expressly incorporated by reference herein.

FIELD OF TECHNOLOGY

The following relates generally to wireless communications and to methods for self-interference and cross-link interference measurements in millimeter wave (mmW) bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support methods for self-interference and cross-link interference measurements in millimeter wave (mmW) bands. Various aspects provide that a user equipment (UE) may receive configuration information from a base station that indicates one or more slot format index (SFI) values that are compatible for cross-link interference or self-interference measurements. Based on the configured SFI(s), the UE may measure interference in multiple symbols, which may be used to estimate an amount of cross-link interference or self-interference, and transmit a measurement report to the base station. In some cases, the UE may indicate one or more SFIs that are compatible for communications with the UE based on the interference measurements. The base station, based on the measurement report, may identify one or more compatible SFIs for communications with one or more UEs, and perform communications using the identified compatible SFIs. In some cases, the interference measurements may identify cross-link interference at the UE that results from transmissions of a different UE. In some cases, the interference measurements may identify self-interference of concurrent communications of multiple channels at a same UE.

A method of wireless communication at a base station is described. The method may include selecting a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configuring a first slot format at the first UE with the first SFI and a second slot format at the second UE with the second SFI, and receiving a measurement report for one or more of the first UE or the second UE, the measurement report indicating one or more interference measurements according to the first SFI or the second SFI.

An apparatus for wireless communication at a base station is described. The apparatus may include a processor, memory coupled with the processor, and instructions stored in the memory. The instructions may be executable by the processor to cause the apparatus to select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configure a first slot format at the first UE with the first SFI and a second slot format at the second UE with the second SFI, and receive a measurement report for one or more of the first UE or the second UE, the measurement report indicating one or more interference measurements according to the first SFI or the second SFI.

Another apparatus for wireless communication at a base station is described. The apparatus may include means for selecting a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configuring a first slot format at the first UE with the first SFI and a second slot format at the second UE with the second SFI, and receiving a measurement report for one or more of the first UE or the second UE, the measurement report indicating one or more interference measurements according to the first SFI or the second SFI.

A non-transitory computer-readable medium storing code for wireless communication at a base station is described. The code may include instructions executable by a processor to select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configure a first slot format at the first UE with the first SFI and a second slot format at the second UE with the second SFI, and receive a measurement report for one or more of the first UE or the second UE, the measurement report indicating one or more interference measurements according to the first SFI or the second SFI.

In some examples of the method, apparatuses, and non-transitory computer-readable medium described herein, a first symbol of each of the first SFI and the second SFI is configured to be downlink symbols with each of the first UE and the second UE receiving information from the base station during the first symbol, a second symbol of the first UE is configured for uplink transmissions from the first UE and the second UE is configured for downlink receptions during the second symbol, and the second UE is configured to measure interference from concurrent transmissions from the first UE and the base station during the second symbol relative to a baseline case of downlink reception from the base station alone during the first symbol. Some examples of the method, apparatuses, and non-transitory computer-readable medium described herein may further include operations, features, means, or instructions for configuring either the uplink transmissions or the downlink receptions in the first or the second symbols at the first or the second UE via a reconfiguration of a flexible or a gap symbol, and where the measurement report indicates a cross-link interference measurement of the first UE based on a difference in measurements between the first symbol and the second symbol. In some examples of the method, apparatuses, and non-transitory computer-readable medium described herein, a number of symbols or slots over which the first SFI and second SFI are configured for cross-link interference measurements is based on a sub-carrier spacing (SCS) of the first UE or the second UE. In some examples of the method, apparatuses, and non-transitory computer-readable medium described herein, a number of symbols or slots over which the first SFI and second SFI are configured for cross-link interference measurements is based on an interference estimation quality associated with the measurement report. In some examples of the method, apparatuses, and non-transitory computer-readable medium described herein, the interference estimation quality may be a band-specific, bandwidth part-specific, or link-specific estimation quality.

In some examples of the method, apparatuses, and non-transitory computer-readable medium described herein, a power level at the first UE may be configured based on the first SFI being selected for compatibility for measuring interference between the first UE and the second UE. Some examples of the method, apparatuses, and non-transitory computer-readable medium described herein may further include operations, features, means, or instructions for beamforming parameters of the first UE and the second UE may be configured to be consistent at least during portions of the first SFI and the second SFI that are to be used for measuring cross-link interference between the first UE and the second UE.

Some examples of the method, apparatuses, and non-transitory computer-readable medium described herein may further include operations, features, means, or instructions for receiving, from one or more of the first UE or the second UE, a request to perform an interference measurement for one or more SFIs, and where the selecting and the configuring are performed responsive to the request. In some examples of the method, apparatuses, and non-transitory computer-readable medium described herein, the measurement report is received from the second UE and provides one or more of an indication of a set of compatible SFIs based on interference measurements at the second UE, a first interference estimate associated with a first symbol of a slot during which the first UE does not transmit, a second interference estimate associated with a second symbol of the slot during which the first UE transmits an uplink communication, or any combinations thereof. In some examples of the method, apparatuses, and non-transitory computer-readable medium described herein, the first UE and the second UE may be a same UE, and where the first carrier uses a first frequency band and the second carrier uses a second frequency band that is different than the first frequency band.

A method of wireless communication at a second UE is described. The method may include receiving, from a base station, configuration information that indicates a first SFI for communications via a first carrier, and that indicates at least a first measurement symbol and a second measurement symbol within the indicated SFI, and transmitting a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

An apparatus for wireless communication at a second UE is described. The apparatus may include a processor, memory coupled with the processor, and instructions stored in the memory. The instructions may be executable by the processor to cause the apparatus to receive, from a base station, configuration information that indicates a first SFI for communications via a first carrier, and that indicates at least a first measurement symbol and a second measurement symbol within the indicated SFI, and transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

Another apparatus for wireless communication at a second UE is described. The apparatus may include means for receiving, from a base station, configuration information that indicates a first SFI for communications via a first carrier, and that indicates at least a first measurement symbol and a second measurement symbol within the indicated SFI, and transmitting a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

A non-transitory computer-readable medium storing code for wireless communication at a second UE is described. The code may include instructions executable by a processor to receive, from a base station, configuration information that indicates a first SFI for communications via a first carrier, and that indicates at least a first measurement symbol and a second measurement symbol within the indicated SFI, and transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

In some examples of the method, apparatuses, and non-transitory computer-readable medium described herein, the first measurement symbol is configured to be a downlink symbol for receiving information at the second UE from the base station during the first measurement symbol, the second measurement symbol is configured for uplink transmissions at a first UE and is configured to be a downlink symbol for receiving information from the base station at the second UE, and the measurement report indicates interference from concurrent transmissions from the first UE and the base station during the second measurement symbol relative to a baseline case of downlink reception from the base station alone during the first measurement symbol. Some examples of the method, apparatuses, and non-transitory computer-readable medium described herein may further include operations, features, means, or instructions for receiving, from the base station, further configuration information that configures either the uplink transmissions or downlink receptions in the first or the second measurement symbols via a reconfiguration of a flexible or a gap symbol, and where the measurement report indicates a cross-link interference measurement of the UE based on a difference in measurements between the first measurement symbol and the second measurement symbol. In some examples of the method, apparatuses, and non-transitory computer-readable medium described herein, the measurement report indicates one or more of a set of SFIs that are compatible for communications with the second UE, a set of beam pairs that are compatible for communications with the second UE, or any combinations thereof.

In some examples of the method, apparatuses, and non-transitory computer-readable medium described herein, a number of symbols or slots over which the first SFI is configured for cross-link measurements may be based on an SCS of the second UE. In some examples of the method, apparatuses, and non-transitory computer-readable medium described herein, a number of symbols or slots over which the first SFI is configured for cross-link measurements may be based on an interference estimation quality associated with the measurement report. In some examples of the method, apparatuses, and non-transitory computer-readable medium described herein, the interference estimation quality may be a band-specific, bandwidth part-specific or link-specific estimation quality.

Some examples of the method, apparatuses, and non-transitory computer-readable medium described herein the receive beamforming parameters of the second UE are configured to be consistent at least during the first measurement symbol and the second measurement symbol. Some examples of the method, apparatuses, and non-transitory computer-readable medium described herein may further include operations, features, means, or instructions for transmitting a request to the base station to perform an interference measurement for one or more slot formats, and where the configuration information is received responsive to the request.

DETAILED DESCRIPTION

Figure 1:
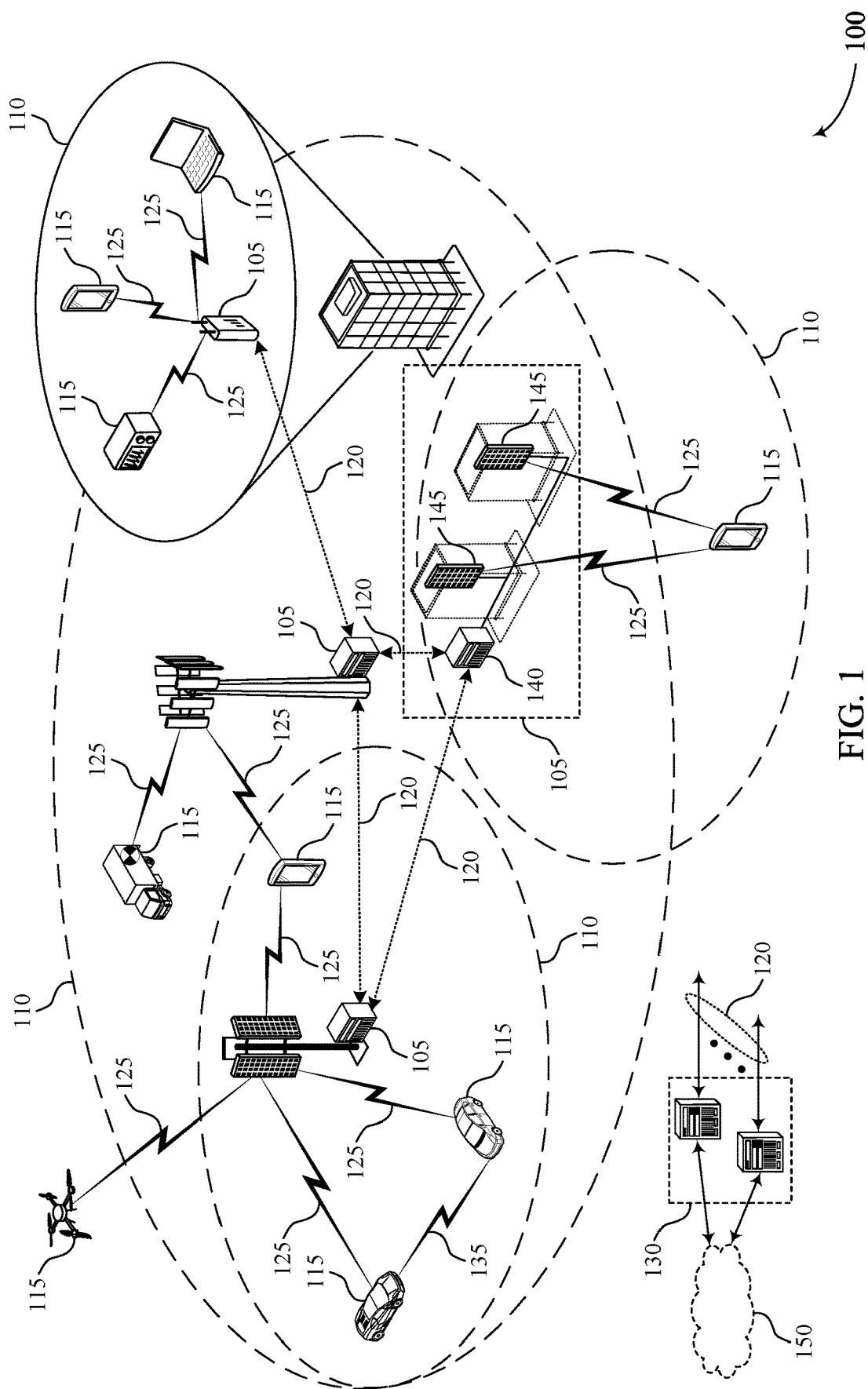
FIG. 1 illustrates an example of a system for wireless communications that supports methods for self-interference and cross-link interference measurements in millimeter wave (mmW) bands in accordance with aspects of the present disclosure.

In some deployments, wireless communications systems may operate in millimeter wave (mmW) frequency ranges (e.g., 24.25-29 GHz, 37-40 GHz, 52.6-71 GHz, etc.). Wireless communications at these frequencies may be associated with increased signal attenuation (e.g., path loss, penetration loss, blockage loss), which may be influenced by various factors, such as diffraction, propagation environment, density of blockages, material properties, etc. As a result, signal processing techniques, such as beamforming, may be used to coherently combine energy and overcome the path losses at these frequencies. Due to the increased amount of path, penetration and blockage losses in mmW communications systems, transmissions between wireless devices (e.g., from a base station and/or a user equipment (UE)) may be beamformed. Moreover, a receiving device may use beamforming techniques to configure antenna(s) and/or antenna array(s) and/or antenna array module(s) such that transmissions are received in a directional manner.

Further, in some deployments, UEs and base stations may communicate using time division duplexing (TDD). In order to provide enhanced flexibility for UEs and base stations, dynamic TDD techniques may be used in which a number of different TDD formats are available in which symbols within a slot may be configured as uplink symbols, downlink symbols, or flexible symbols. A particular TDD format may be selected that is suitable for instantaneous ratios of uplink and downlink traffic at a UE. The particular TDD format may be requested by the UE and/or indicated to the UE as a slot format index (SFI), where multiple different SFIs are mapped to different TDD formats of uplink/downlink or flexible symbols. Further, in cases where the SFI is associated with a slot format that has one or more flexible symbols, the base station may indicate to the UE whether such symbols are to be used as uplink symbols, downlink symbols, or gap symbols that may be used for re-tuning transmit/receive circuitry, measurements at the UE, and the like.

Further, different UEs may be configured with different SFIs, which may result in cross-link interference at one or more other UEs. For example, if a first UE is configured to receive downlink communications in a particular symbol and a neighboring UE is configured to transmit uplink communications in that same symbol, the first UE may experience interference when attempting to receive the downlink communications. Additionally or alternatively, the first UE may have a capability for concurrent communications on different channels (e.g., using inter-band carrier aggregation in different frequency ranges, or using full duplex techniques within the same UE), and may be configured with different SFIs for the different channels, which may result in self-interference at the first UE.

Various techniques as discussed herein provide for self-interference and cross-link interference measurements at one or more UEs. In some cases, a UE may receive configuration information from a base station that indicates one or more SFIs that are compatible for cross-link interference or self-interference measurements. Based on the configured SFI(s), the UE may measure interference in multiple symbols, which may be used to estimate an amount of cross-link interference or self-interference, and transmit a measurement report to the base station. In some cases, the UE may indicate one or more SFIs that are compatible for communications with the UE based on the interference measurements. The base station, based on the measurement report, may identify one or more compatible SFIs for communications with one or more UEs, and perform communications using the identified compatible SFIs.

In some cases, the base station may coordinate compatible SFIs at different UEs, or within a same UE, and may coordinate beams, such that an appropriate set of symbols are configured in transmit or receive roles across one or more slots of the one or more UEs to enable self-interference or cross-link interference measurements. In some cases, a UE with one or more symbols configured in the receive role may measure interference in different symbols, where at least one of the measured symbols is used for transmission of another UE, or the same UE (e.g., on another carrier in an inter-band carrier aggregation configuration). A measurement report that indicates measured interferences may be used at the UE, or at the base station, to identify one or more compatible SFIs for concurrent communications, one or more beamforming parameters, or any combinations thereof, for subsequent communications of the one or more UEs.

In some cases, a number of symbols/slots over which coordination is needed for measurements is dependent on one or more of a sub-carrier spacing (SCS) across one or more UEs, a cross-link interference or self-interference estimation quality (e.g., which may be band-specific or link quality-specific), or any combinations thereof. Further, in some cases, power levels for the concurrent communications may be set by the base station such that uplink transmissions in uplink symbols of a UE in a transmit role are appropriate for measuring interference. In some cases, one or more UEs may transmit a request to the base station to perform the measurements, or the base station may determine that the measurement procedure is to be performed. In some cases, based on measurements at the UE in the measurement role and self-interference or cross-link interference levels identified with these measurements, the UE may recommend a set of compatible SFI pairs for communications, appropriate sets of beam pairs for use in communications, or combinations thereof.

Such techniques may provide one or more advantages in systems that utilize dynamic TDD. For example, by allowing a measurement of cross-link interference or self-interference at a UE, more accurate estimation of interference between different SFIs may be determined which may allow for selection of compatible SFIs and beam pairs for subsequent communications. This may result in enhanced likelihood of successful communications through management of potential interference sources. Wireless resource efficiency may be further enhanced by scheduling of devices for concurrent communications, which may allow multiple devices to communicate and thereby increase overall system throughput. Additionally, beamforming parameter selection based on interference measurements may reduce instances where the transmitting device may interfere with receiving devices, which may reduce instances of retransmissions of unsuccessfully received communications.

Aspects of the disclosure are initially described in the context of wireless communications systems. Various examples of SFIs and measurement techniques are then discussed. Aspects of the disclosure are further illustrated by and described with reference to apparatus diagrams, system diagrams, and flowcharts that relate to methods for self-interference and cross-link interference measurements in mmW bands.

FIG. 1 illustrates an example of a wireless communications system 100 that supports methods for self-interference and cross-link interference measurements in mmW bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support mmW communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some cases, one or more UEs 115 may perform self-interference or cross-link interference measurements in accordance with techniques as described herein. In some cases, a UE 115 may receive configuration information from a base station 105 that indicates one or more SFI values that are compatible for cross-link interference or self-interference measurements. Based on the configured SFI(s), the UE 115 may measure interference in multiple symbols, which may be used to estimate an amount of cross-link interference or self-interference, and the UE 115 may transmit a measurement report to the base station 105. In some cases, the UE 115 may indicate one or more SFIs that are compatible for communications based on the interference measurements. The base station 105, based on the measurement report, may identify one or more compatible SFIs for communications with one or more UEs 115, and perform subsequent communications using the identified compatible SFIs. In some cases, the interference measurements may identify cross-link interference at the UE 115 that results from transmissions of a different UE 115. In some cases, the interference measurements may identify self-interference of concurrent communications of multiple channels at a same UE 115.

Figure 2:
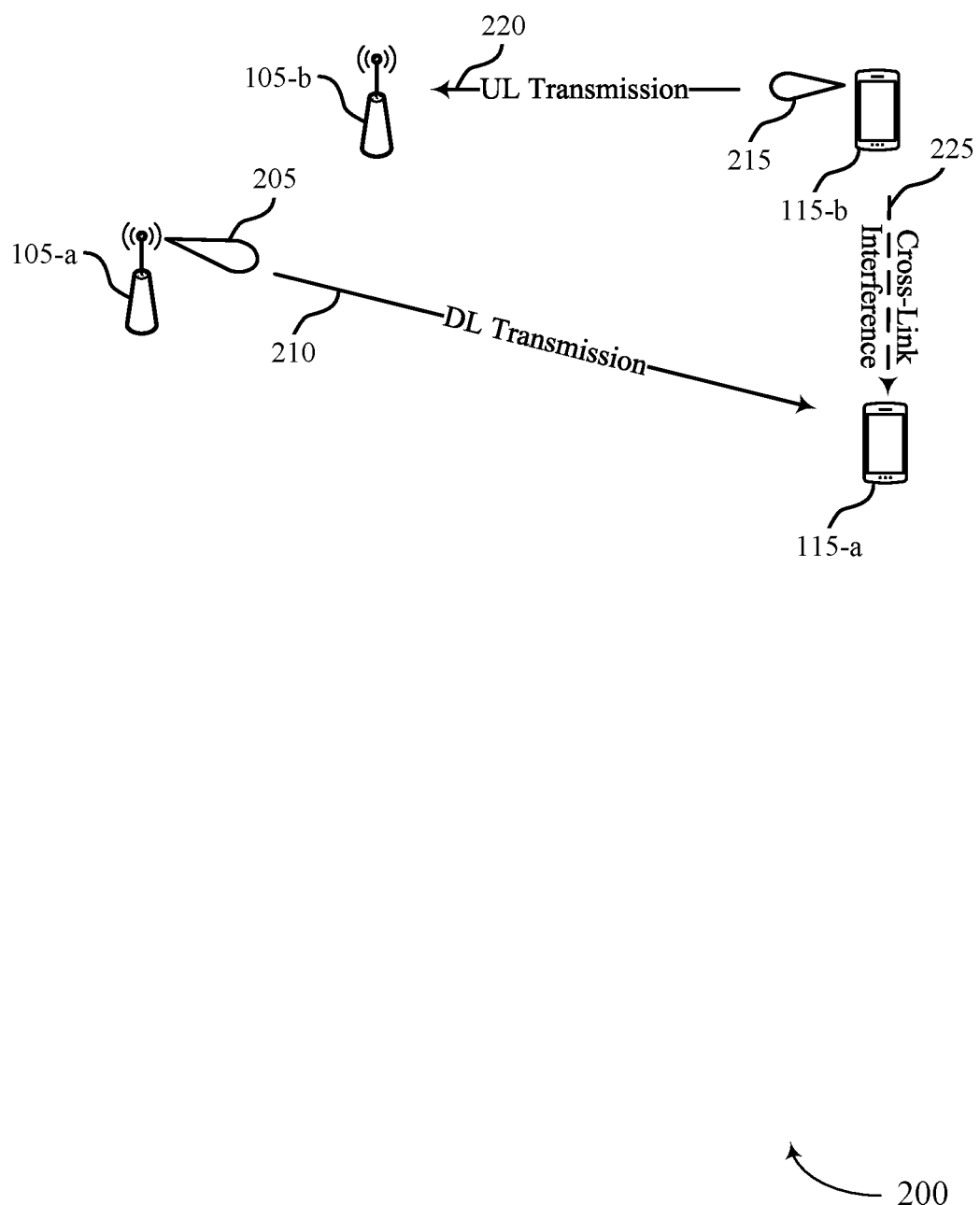
FIG. 2 illustrates an example of a portion of a wireless communications system that supports methods for self-interference and cross-link interference measurements in mmW bands in accordance with aspects of the present disclosure.

FIG. 2 illustrates an example of a wireless communications system 200 that supports methods for self-interference and cross-link interference measurements in mmW bands in accordance with aspects of the present disclosure. In some examples, wireless communications system 200 may implement aspects of wireless communications system 100. In this example, wireless communications system 200 includes a first UE 115-a, a second UE 115-b, a first base station 105-a that may provide a serving cell for the first UE 115-a, and a second base station 105-b that may provide a serving cell for the second UE 115-b. While illustrated separately, in some cases the first base station 105-a and the second base station 105-b may be part of a same base station (e.g., radio heads or antenna panels of a gNB). The UEs 115 and base stations 105 may be examples of UEs 115 and base stations 105 as described with reference to FIG. 1.

Figure 3:
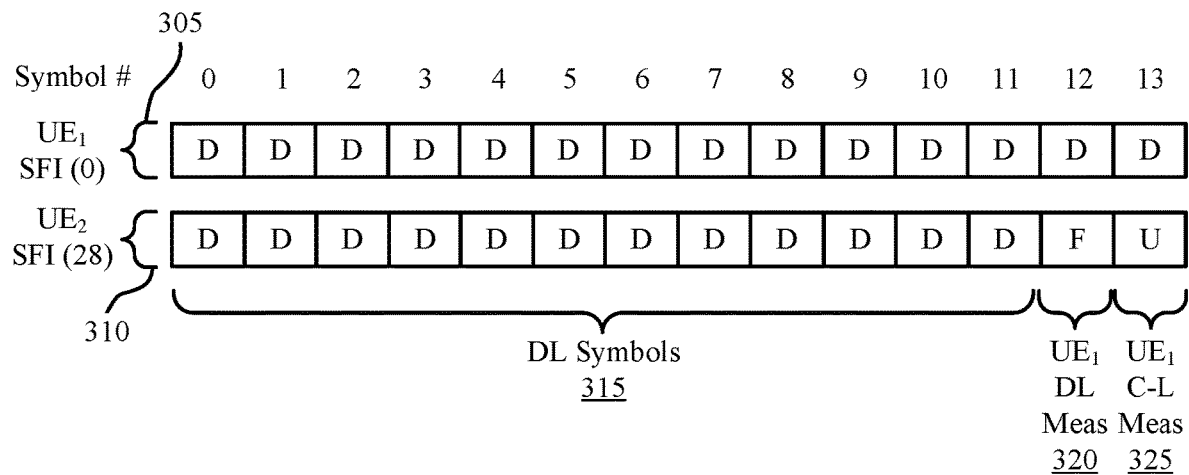
FIG. 3 illustrates an example of configured slot formats that support methods for self-interference and cross-link interference measurements in mmW bands in accordance with aspects of the present disclosure.
Figure 4:
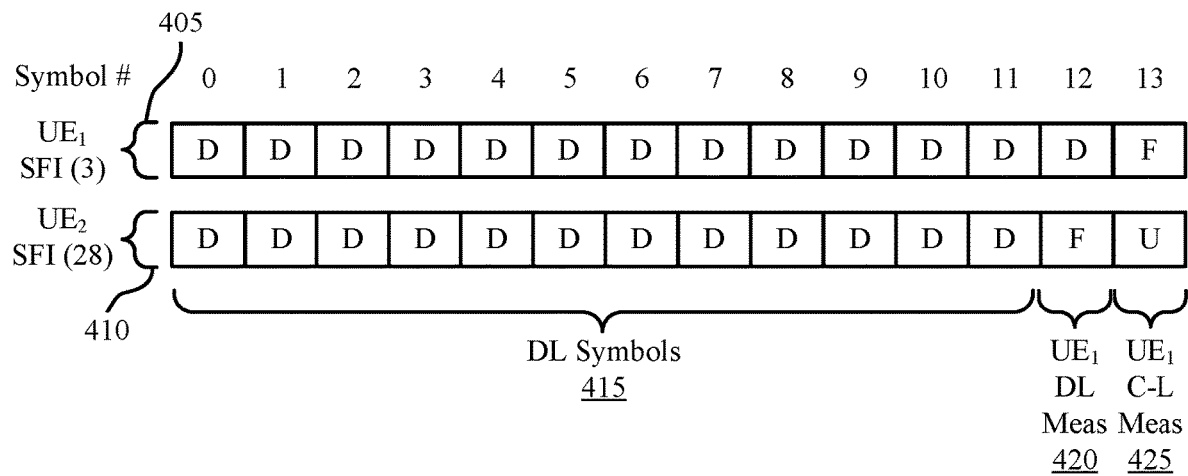
FIG. 4 illustrates an example of configured slot formats that support methods for self-interference and cross-link interference measurements in mmW bands in accordance with aspects of the present disclosure.
Figure 5:
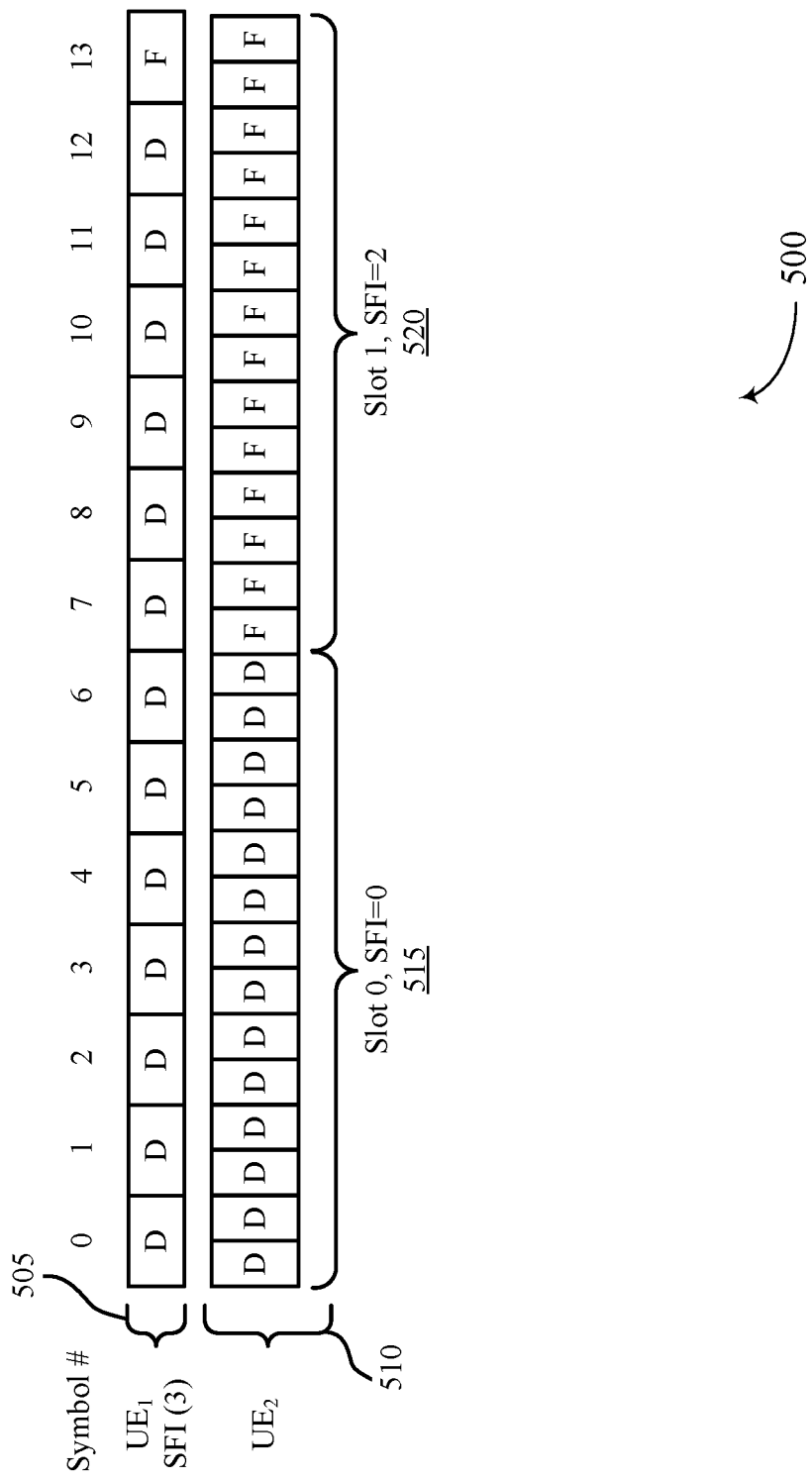
FIG. 5 illustrates an example of configured slot formats that support methods for self-interference and cross-link interference measurements in mmW bands in accordance with aspects of the present disclosure.

The first base station 105-a may use a downlink beam 205 to transmit downlink communications 210 to the first UE 115-a. Further, second UE 115-b may use an uplink beam 215 to transmit uplink communications 220 to the second base station 105-b. In other examples, a same UE 115 may both receive downlink communications 210 and transmit uplink communications 220, such as according to intra- or inter-band carrier aggregation techniques or in a full-duplex mode of operation. As discussed herein, in some cases TDD may be used for communications between the base stations 105 and UEs 115, in which each UE 115 may be configured with one or a number of different available TDD slot formats that may be indicated to the UEs 115 in an SFI. In some cases, one or more symbols of the TDD format may provide uplink communications from the second UE 115-b to the second base station 105-b while the same symbols provide for downlink communications from the first base station 105-a to the first UE 115-a, which may result in cross-link interference 225 at the first UE 115-a. Similarly, in cases where the first UE 115-a transmits uplink communications in symbols during which the second UE 115-b receives downlink communications, the second UE 115-b may experience such cross-link interference 225. Further, in cases where a same UE 115 may communicate in different directions during a one or more symbols, such a UE 115 may generate self-interference between its own transmit beam and receive beam. As discussed herein, various techniques for measuring and reporting cross-link interference or self-interference. FIGS. 3 through 5 provide a number of examples of cross-link interference or self-interference and measurement of same.

FIG. 3 illustrates an example of configured slot formats 300 that support methods for self-interference and cross-link interference measurements in mmW bands in accordance with aspects of the present disclosure. In some examples, configured slot formats 300 may implement aspects of wireless communications system 100 or 200. In this example, a first UE, or a first carrier of a first UE (e.g., a UE 115 of FIG. 1 or 2), may be configured with a first SFI 305 (e.g., SFI 0) that provides a slot format with all downlink symbols. A second UE, or a second carrier of the first UE, may be configured with a second SFI 310 (e.g., SFI 28) that provides a slot format with downlink symbols for symbols 0 through 11, a flexible symbol at symbol 12, and an uplink symbol at symbol 13.

In some cases, to enable inter-band self-interference measurements within the UE or cross-link interference measurements across UEs, the measurements at the first UE may be configured in accordance with the first SFI 305 and the second SFI 310. It is noted that in this example a same SCS is assumed, and thus slot durations are the same. In some cases, a serving base station may configure the SFIs such that efficient self-interference or cross-link interference measurements may be made. In this example, a first set of symbols 315 across both the first SFI 305 and the second SFI 310 are downlink symbols, with differences present in the last two symbols of the slot in which a symbol 12 of the second SFI 310 is configured as a flexible/gap symbol 320 during which the first UE can measure downlink interference, and in which symbol 13 of the second SFI 310 is configured as an uplink symbol 325 during which the first UE can measure self-interference or cross-link interference. While differences in symbols are shown in the final two symbols of the slots in this example, it is to be understood that this example is provided for purposes of illustration and discussion only, and techniques such as discussed herein may be used in numerous different slot formats that may be coordinated across UEs so that one UE transmits and another has a flexible/gap symbol for measurement.

As indicated, the first SFI 305 and the second SFI 310 may be configured at different UEs, or at a same UE for transmit/receive parts of the device (e.g., in inter-band carrier aggregation, such as frequency range FR2/FR4 CA, or in full-duplex operation). In this example, the second UE may be configured by the base station to not transmit on the flexible/gap symbol 320, while the first UE is configured to receive and measure downlink communications from the base station during symbol 320. Then, the second UE is configured to transmit in uplink symbol 325, during which the first UE may measure. The first UE may thus determine a differential measurement, which may be used to estimate cross-link interference or self-interference at the UE. In some cases, the first UE may transmit a measurement report to the base station, and the base station may select one or more SFIs, beam pairs, or combinations thereof, for subsequent communications at the first UE and second UE (or different carriers of the first UE) that are compatible with the estimated interference that is based on the measurements at the first UE. In some cases, the first UE may provide an indication of one or more compatible SFIs based on the measurements, which may be selected at the base station for subsequent communications. In some cases, downlink transmission beams for the first UE may be coordinated to be the same across symbol 320 and symbol 325, to help provide for consistency of measurements (e.g., by using the same parameters across the symbols). Further, power levels for usage across symbol 320 and symbol 325 may be configured to ensure good quality measurements that also simultaneously do not interfere with other nodes in the network. Further, in some cases, the SFI used for measurement at the first UE may be selected to provide more accurate estimates of interference, such as by having the measuring UE measure during a flexible symbol, such as is illustrated in FIG. 4.

FIG. 4 illustrates an example of a configured slot format 400 that supports methods for self-interference and cross-link interference measurements in mmW bands in accordance with aspects of the present disclosure. In some examples, configured slot format 400 may implement aspects of wireless communications system 100 or 200. In this example, a first UE, or a first carrier of a first UE (e.g., a UE 115 of FIG. 1 or 2), may be configured with a first SFI 405 (e.g., SFI 3) that provides a slot format with downlink symbols in slots 0 through 12, and a flexible symbol in symbol 13. A second UE, or a second carrier of the first UE, may be configured with a second SFI 410 (e.g., SFI 28) that provides a slot format with downlink symbols for symbols 0 through 11, a flexible symbol at symbol 12, and an uplink symbol at symbol 13.

In this example, inter-band self-interference within the UE or cross-link interference across UEs may be measured at the first UE based on the first SFI 405 and the second SFI 410. This example again assumes a same SCS for each SFI, and thus slot durations are the same. In this example, a first set of symbols 415 across both the first SFI 405 and the second SFI 410 are downlink symbols, with differences present in the last two symbols of the slot in which a symbol 12 of the second SFI 410 is configured as a flexible/gap symbol 420 during which the first UE can measure downlink interference, and in which symbol 13 of the second SFI 410 is configured as an uplink symbol 425 for the second UE and as a flexible symbol during which the first UE can measure self-interference or cross-link interference.

In this example, the second UE may be configured by the base station to not transmit on the flexible/gap symbol 420, while the first UE is configured to receive and measure downlink communications from the base station during symbol 420. In the last symbol 425 the second UE, or second carrier at the first UE, may be configured for an uplink transmission while the first UE, or first carrier at the first UE, may be configured to receive and measure on the flexible symbol. Based on these two measurements, the first UE can determine a relative cross-link interference or self-interference. In this example, similarly as in the example of FIG. 3, beams may be coordinated to be the same across the measurement symbols to ensure consistency of measurements, and power levels may be configured appropriately to ensure good quality measurements that do not interfere with other nodes in the network.

In some cases, irrespective of whether a same or different SCS are used for the two UEs or two carriers, confidence in interference measurements may be used to determine how many symbols (e.g., a measurement window length) are configured for measurements at the first UE, or at the second UE in cases where the second UE also measures interference in accordance with the configured SFIs. In some cases, a measurement window length may be band-specific, may be link quality-specific, may be deployment specific, or combinations thereof. A longer average measurement window may be needed in some cases to filter out short-term variations and noise, but incurs additional overhead of increased latencies in interference estimation for cross-link interference or self-interference, or both. In some cases, the base station may select the measurement window duration based on such factors.

FIG. 5 illustrates an example of a configured slot format 500 that supports methods for self-interference and cross-link interference measurements in mmW bands in accordance with aspects of the present disclosure. In some examples, configured slot format 500 may implement aspects of wireless communications system 100 or 200. In this example, a first UE, or a first carrier of a first UE (e.g., a UE 115 of FIG. 1 or 2), may be configured with a first SFI 505 (e.g., SFI 3) that provides a slot format with downlink symbols in slots 0 through 12, and a flexible symbol in symbol 13.

In the example of FIG. 5, a second UE, or a second carrier of the first UE, may be configured with a different SCS than the first UE, and thus different slot durations are used. In this example, the second UE or second carrier may have an SCS that provides two slots that correspond to the single slot of the first UE (e.g., the second UE/carrier may have a 240 kHz SCS versus a 120 kHz SCS for the first UE/carrier), including a first slot 515 configured with an SFI with all downlink symbols (e.g., SFI=0) and a second slot 520 configured with an SFI with all flexible symbols (e.g., SFI=2). The base station, based on a determination that cross-link or self-interference measurement is to be performed, may configure SFIs across the multiple slots so one UE transmits and another has a flexible/gap symbol for measurement for one or more symbols. Thus, in this example, the second UE/carrier may be configured to transmit in the last one or two symbols of the second slot 520. Additionally, in some cases, the base station may configure the UE(s) such that an interference measurement associated with the second UE or second carrier of the first UE may be performed. For example, in symbol 12 of the first UE/carrier, the second UE/carrier may be configured for downlink and uplink symbols of the two corresponding symbols at the second UE/carrier, and the first UE may measure relative interference in order to estimate cross-link interference or self-interference that is present from the second UE or second carrier. The first UE/carrier in symbol 13 may transmit an uplink communication, and the second UE, or second carrier at the first UE, may then measure to determine cross-link or self-interference from the first UE/carrier. Thus, in such cases, cross-link interference or self-interference may be measured both at the first UE/carrier and the second UE/carrier. Further, irrespective of whether the same or different SCS are used for the two UEs or carriers at a same UE, a confidence in interference measurements may be used to determine how many symbols are to be included in a measurement window length for measurements at either UE. In some cases, measurement window length may be band-specific, link quality-specific, deployment specific, or combinations thereof, similarly as discussed with respect to FIGS. 3 and 4.

Figure 6:
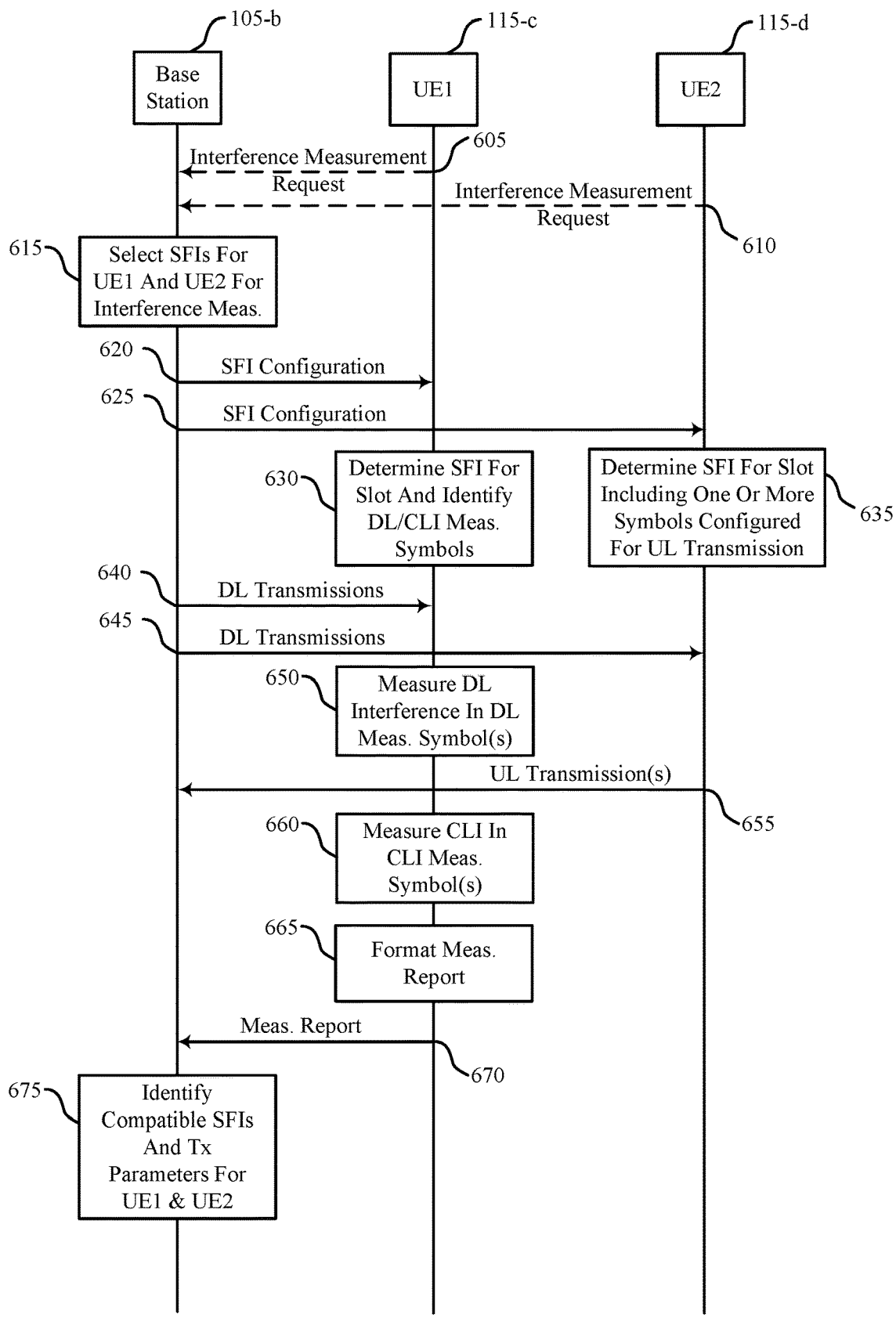
FIG. 6 illustrates an example of a process flow that supports methods for self-interference and cross-link interference measurements in mmW bands in accordance with aspects of the present disclosure.

FIG. 6 illustrates an example of a process flow 600 that supports methods for self-interference and cross-link interference measurements in mmW bands in accordance with aspects of the present disclosure. In some examples, process flow 600 may implement aspects of wireless communications system 100 or 200. Process flow 600 may be implemented by a first UE 115-c, a second UE 115-d, and a base station 105-b, which may be examples of UEs 115 and base stations 105 as described herein. Alternative examples of the following may be implemented, where some steps are performed in a different order than described or are not performed at all. In some cases, steps may include additional features not mentioned below, or further steps may be added.

At 605, the first UE 115-c may optionally transmit an interference measurement request to the base station 105-b. At 610, the second UE 115-d may optionally transmit an interference measurement request to the base station 105-b. In some cases, a determination that an interference measurement is needed may be based on, for example, decoding error rates exceeding a threshold value, intermittent decoding errors, detection of increased interference in certain symbols or slots, or combinations thereof. The interference measurement requests may be transmitted to the base station 105-b in RRC signaling, in a MAC-CE, in uplink control information (UCI), or any combinations thereof.

At 615, the base station 105-b may select SFIs for the first UE 115-c and the second UE 115-d, where the SFIs are selected in order to be compatible with interference measurements at one or both of the first UE 115-c or second UE 115-d. In some cases, the SFIs are selected to provide, for example, that the first UE 115-c is configured with a downlink symbol or a flexible/gap symbol for one or more symbols in a slot, which may include a first symbol. The first UE 115-c in such cases may be configured by the SFI configuration to measure interference levels associated with regular downlink communications from the base station 105-b in the first symbol (and optionally one or more other symbols based on a measurement window), and may be configured by the SFI configuration to measure cross-link interference or self-interference in at least a second symbol (e.g., downlink symbols or symbols configured as flexible/gap symbols). The second UE 115-d may also be configured by the SFI configuration to refrain from transmitting during at least the first symbol, and to perform an uplink transmission during at least the second symbol to allow for cross-link interference or self-interference measurement. At 620, the base station 105-b may transmit the SFI configuration for the first UE 115-c. At 625, the base station 105-b may transmit the SFI configuration for the second UE 115-d. The SFI may be transmitted, in some cases, in downlink control information (DCI) to each UE 115, in a MAC-CE, in RRC signaling, or any combinations thereof.

At 630, the first UE 115-c may determine the SFI for an upcoming slot and identify one or more symbols for downlink interference measurement (e.g., the first symbol and optionally one or more other symbols) and identify one or more symbols for cross-link interference measurement (e.g., the second symbol and optionally one or more other symbols). Similarly, at 635, the second UE 115-d may determine the SFI for the upcoming slot, identify one or more symbols (e.g., at least the first symbol) during which no transmissions are configured, and identify one or more symbols (e.g., at least the second symbol) during which the second UE 115-d is to transmit uplink communications. Additionally, in some cases, the second UE 115-d may be configured to perform measurements in one or more symbols, thus allowing both the first UE 115-c and the second UE 115-d to determine an estimate of cross-link or self-interference, such as discussed with reference to FIG. 5.

At 640, the base station 105-b may transmit downlink transmissions to the first UE 115-c in accordance with the SFI that is configured at the first UE 115-c. Concurrently, at 645 the base station 105-b may transmit downlink transmissions to the second UE 115-d in accordance with the SFI that is configured at the second UE 115-d. At 650, the first UE 115-c may measure downlink interference in one or more configured downlink measurement symbols.

At 655, the second UE 115-d may transmit uplink transmissions in one or more symbols, in accordance with the configured SFI at the second UE 115-d. At 660, the first UE 115-c may measure cross-link interference in one or more configured downlink or flexible/gap measurement symbols that correspond to the symbols used by the second UE 115-d for uplink communications.

At 665, the first UE 115-c may format a measurement report based on the downlink and cross-link or self-interference measurements. In some cases, the measurement report may also provide an indication of one or more SFIs that the first UE 115-c may identify as being compatible for concurrent communications of both the first UE 115-c and the second UE 115-d. At 670, the first UE 115-c may transmit the measurement report to the base station 105-b. At 675, the base station 105-b may identify compatible SFIs for both the first UE 115-c and the second UE 115-d, may identify compatible beam pairs for concurrent communications with the first UE 115-c and the second UE 115-d. The identified SFIs and beam pairs may then be used for subsequent communications of the first UE 115-c, second UE 115-d, and base station 105-b.

Figure 7:
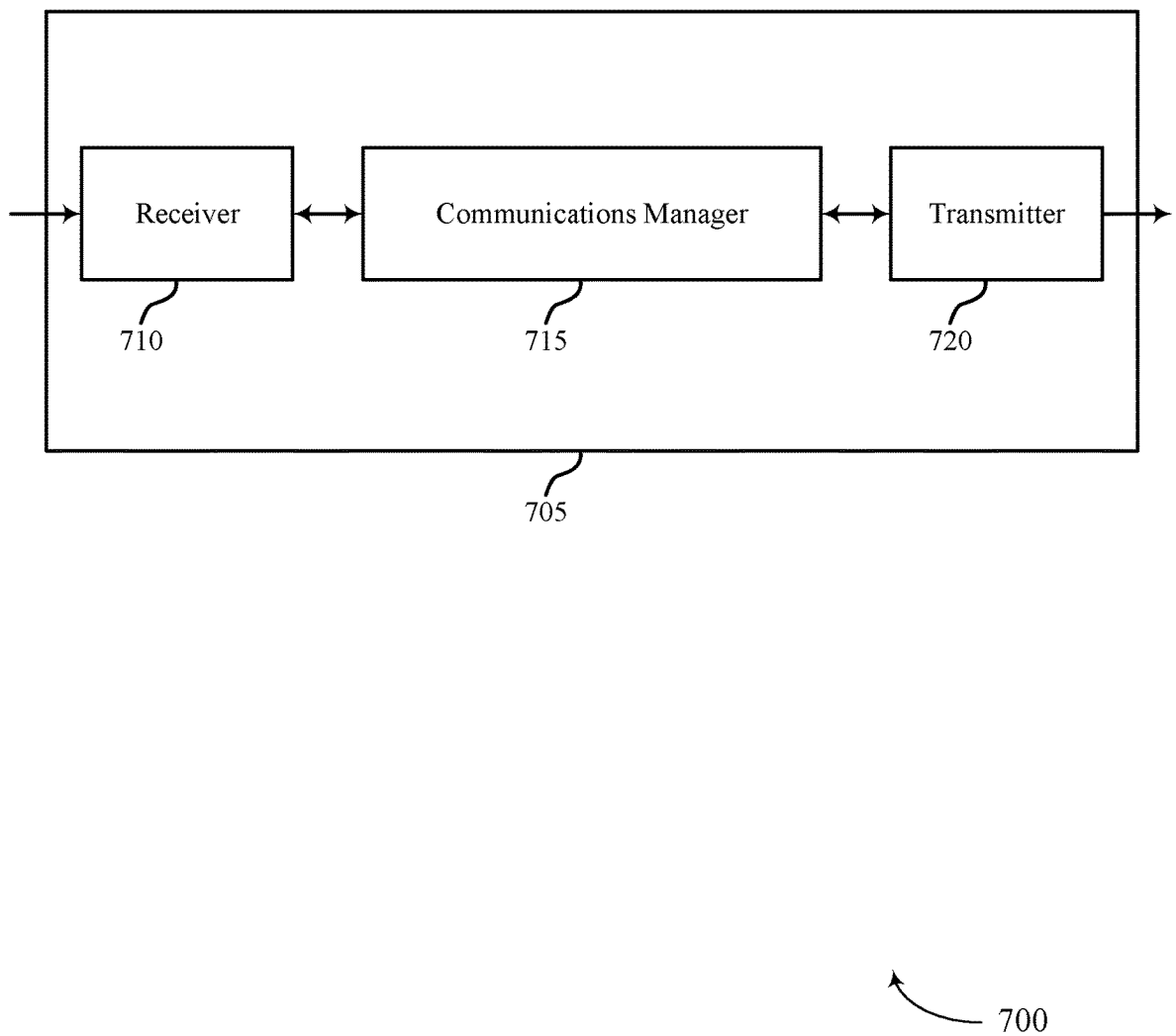
FIGS. 7 and 8 show block diagrams of devices that support methods for self-interference and cross-link interference measurements in mmW bands in accordance with aspects of the present disclosure.

FIG. 7 shows a block diagram 700 of a device 705 that supports methods for self-interference and cross-link interference measurements in mmW bands in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to methods for self-interference and cross-link interference measurements in mmW bands, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, configuration information that indicates a first SFI for communications via a first carrier, and that indicates at least a first measurement symbol and a second measurement symbol within the indicated SFI, determine a first interference estimate based on a first interference measurement during the first measurement symbol, determine a second interference estimate based on a second interference measurement during the second measurement symbol, and transmit a measurement report to the base station that provides one or more of the first interference measurement, the second interference measurement, an indication of a set of compatible SFIs based on the first interference estimate and the second interference estimate, or any combinations thereof.

The communications manager 715 may also receive, from a base station, configuration information that indicates a first SFI for communications via a first carrier, and that indicates at least a first measurement symbol and a second measurement symbol within the indicated SFI, and transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol. The communications manager 715 may be an example of aspects of the communications manager 1010 described herein.

The communications manager 715 may as described herein be implemented to realize one or more potential advantages. One implementation may allow the device 705 to reliably determine cross-link interference, self-interference, or combinations thereof, and report the determined interference to a base station, which may allow for enhanced reliability and reduced latency for communications based on interference mitigation or avoidance. Further, implementations may allow the device 705 to initiate an interference measurement procedure based on detected channel conditions, which can further provide for reduced latency of communications, and increase signaling reliability, throughput, and user experience, among other advantages.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
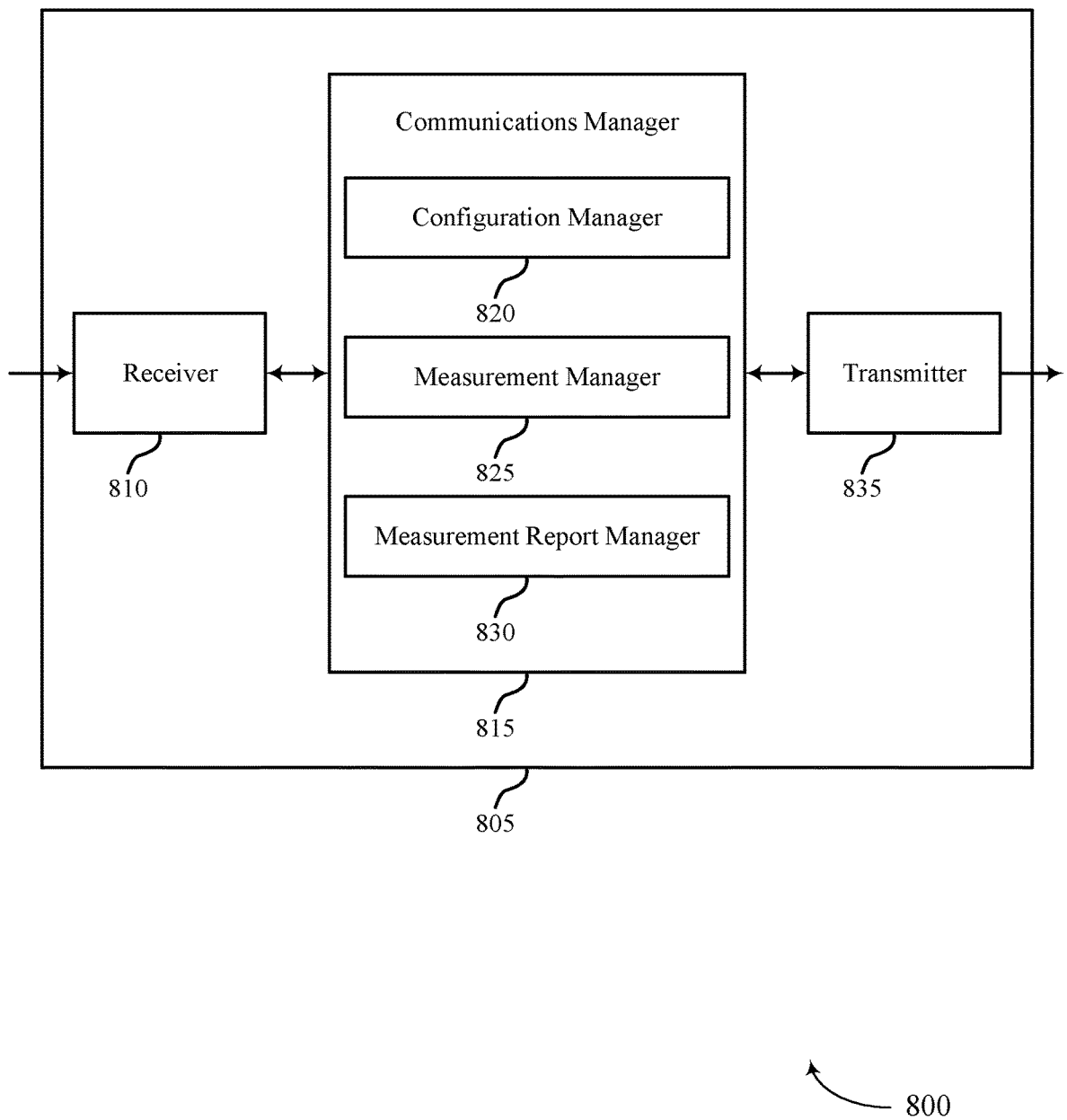

FIG. 8 shows a block diagram 800 of a device 805 that supports methods for self-interference and cross-link interference measurements in mmW bands in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to methods for self-interference and cross-link interference measurements in mmW bands, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a configuration manager 820, a measurement manager 825, and a measurement report manager 830. The communications manager 815 may be an example of aspects of the communications manager 1010 described herein.

The configuration manager 820 may receive, from a base station, configuration information that indicates a first SFI for communications via a first carrier, and that indicates at least a first measurement symbol and a second measurement symbol within the indicated SFI.

The measurement manager 825 may determine a first interference estimate based on a first interference measurement during the first measurement symbol and determine a second interference estimate based on a second interference measurement during the second measurement symbol.

The measurement report manager 830 may transmit a measurement report to the base station that provides one or more of the first interference measurement, the second interference measurement, an indication of a set of compatible SFIs based on the first interference estimate and the second interference estimate, or any combinations thereof.

The configuration manager 820 may also receive, from a base station, configuration information that indicates a first SFI for communications via a first carrier, and that indicates at least a first measurement symbol and a second measurement symbol within the indicated SFI. The measurement report manager 830 may also transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
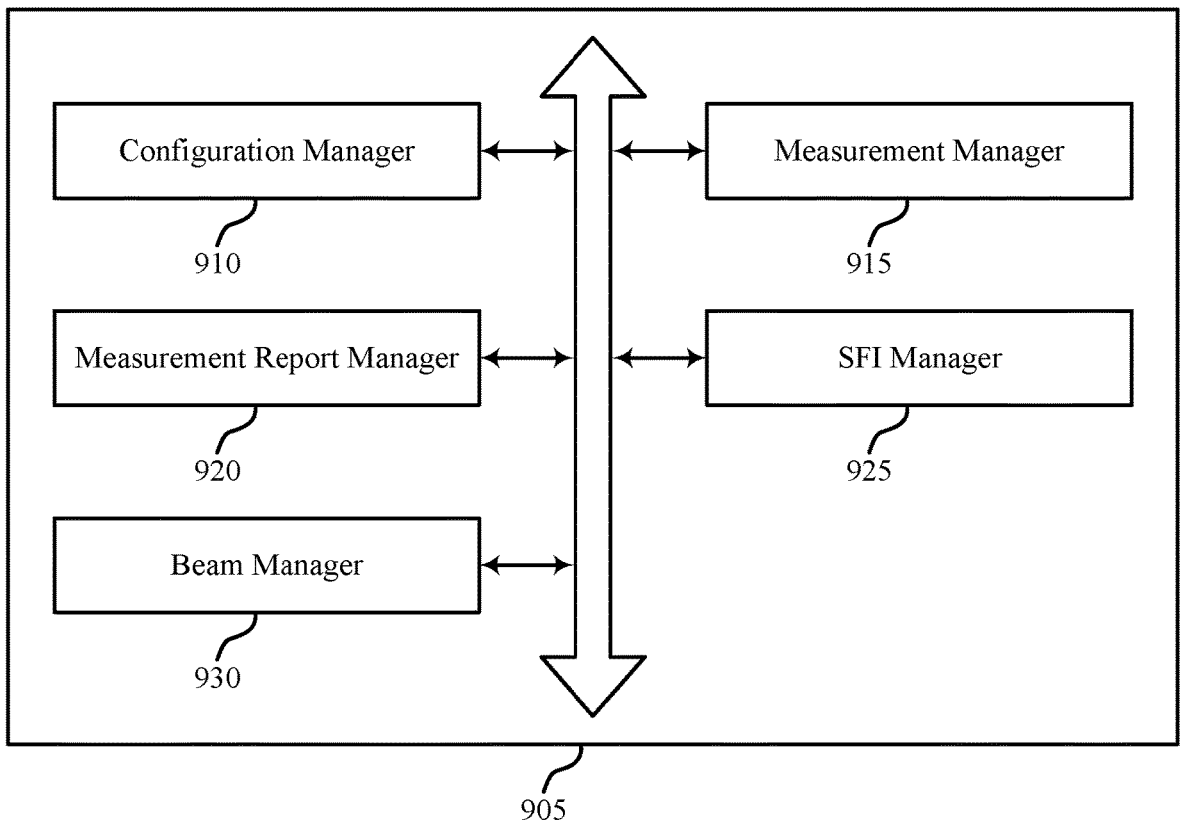
FIG. 9 shows a block diagram of a communications manager that supports methods for self-interference and cross-link interference measurements in mmW bands in accordance with aspects of the present disclosure.

FIG. 9 shows a block diagram 900 of a communications manager 905 that supports methods for self-interference and cross-link interference measurements in mmW bands in accordance with aspects of the present disclosure. The communications manager 905 may be an example of aspects of a communications manager 715, a communications manager 815, or a communications manager 1010 described herein. The communications manager 905 may include a configuration manager 910, a measurement manager 915, a measurement report manager 920, an SFI manager 925, and a beam manager 930. Each of these modules may communicate, directly or indirectly, with one another (e.g., via one or more buses).

The configuration manager 910 may receive, from a base station, configuration information that indicates a first SFI for communications via a first carrier, and that indicates at least a first measurement symbol and a second measurement symbol within the indicated SFI. In some examples, the configuration manager 910 may receive, from the base station, further configuration information that configures either the uplink transmissions or downlink receptions in the first or the second measurement symbols via a reconfiguration of a flexible or a gap symbol.

In some cases, the first measurement symbol is configured to be a downlink symbol for receiving information at the second UE from the base station during the first measurement symbol. In some cases, the second measurement symbol is configured for uplink transmissions at a first UE and is configured to be a downlink symbol for receiving information from the base station at the second UE.

The measurement manager 915 may determine a first interference estimate based on a first interference measurement during the first measurement symbol. In some examples, the measurement manager 915 may determine a second interference estimate based on a second interference measurement during the second measurement symbol. The measurement report manager 920 may transmit a measurement report to the base station that provides one or more of the first interference measurement, the second interference measurement, an indication of a set of compatible SFIs based on the first interference estimate and the second interference estimate, or any combinations thereof. In some examples, the measurement report indicates a cross-link interference measurement of the UE based on a difference in measurements between the first measurement symbol and the second measurement symbol.

In some examples, the measurement report manager 920 may transmit a request to the base station to perform an interference measurement for one or more slot formats, and where the configuration information is received responsive to the request. In some cases, the measurement report indicates interference from concurrent transmissions from the first UE and the base station during the second measurement symbol relative to a baseline case of downlink reception from the base station alone during the first measurement symbol. In some cases, the measurement report indicates one or more of a set of SFIs that are compatible for communications with the second UE, a set of beam pairs that are compatible for communications with the second UE, or any combinations thereof. In some cases, the interference estimation quality is a band-specific, bandwidth part-specific or link-specific estimation quality.

The SFI manager 925 may identify and configure SFIs. In some cases, a number of symbols or slots over which the first SFI is configured for cross-link measurements is based on an SCS of the second UE. In some cases, a number of symbols or slots over which the first SFI is configured for cross-link measurements is based on an interference estimation quality associated with the measurement report.

The beam manager 930 may receive beamforming parameters of the second UE that are configured to be consistent at least during the first measurement symbol and the second measurement symbol.

In some examples, the configuration manager 910 may receive, from a base station, configuration information that indicates a first SFI for communications via a first carrier, and that indicates at least a first measurement symbol and a second measurement symbol within the indicated SFI. In some examples, the measurement report manager 920 transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

Figure 10:
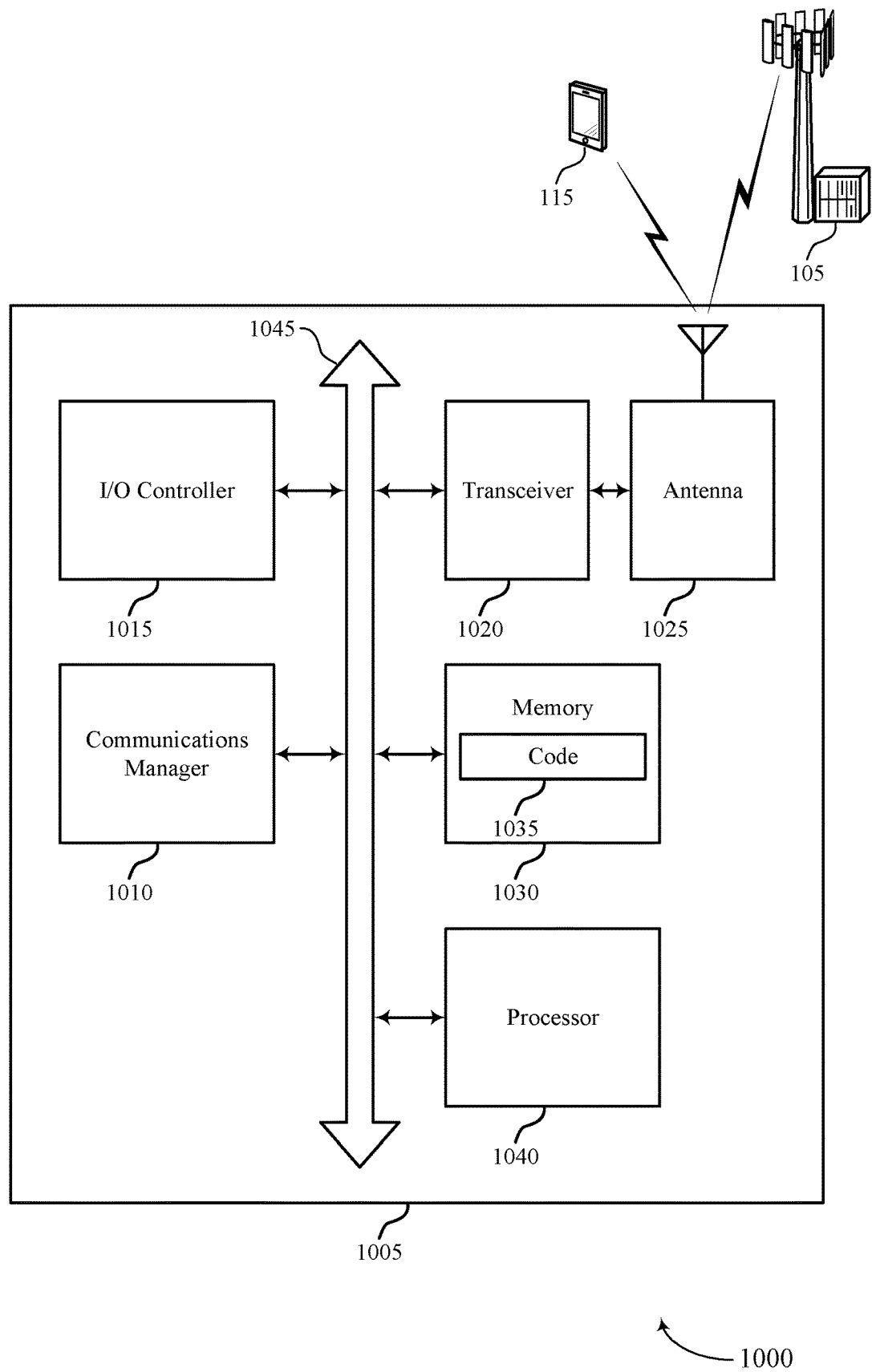
FIG. 10 shows a diagram of a system including a device that supports methods for self-interference and cross-link interference measurements in mmW bands in accordance with aspects of the present disclosure.

FIG. 10 shows a diagram of a system 1000 including a device 1005 that supports methods for self-interference and cross-link interference measurements in mmW bands in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, configuration information that indicates a first SFI for communications via a first carrier, and that indicates at least a first measurement symbol and a second measurement symbol within the indicated SFI, determine a first interference estimate based on a first interference measurement during the first measurement symbol, determine a second interference estimate based on a second interference measurement during the second measurement symbol, and transmit a measurement report to the base station that provides one or more of the first interference measurement, the second interference measurement, an indication of a set of compatible SFIs based on the first interference estimate and the second interference estimate, or any combinations thereof.

The communications manager 1010 may also receive, from a base station, configuration information that indicates a first SFI for communications via a first carrier, and that indicates at least a first measurement symbol and a second measurement symbol within the indicated SFI, and transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol.

The communications manager 1010 may as described herein be implemented to realize one or more potential advantages. One implementation may allow the device 1005 to reliably determine cross-link interference, self-interference, or combinations thereof, and select compatible SFIs and beam pair links for communications with one or more UEs, which may allow for enhanced reliability and reduced latency for communications based on interference mitigation or avoidance.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting methods for self-interference and cross-link interference measurements in mmW bands).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
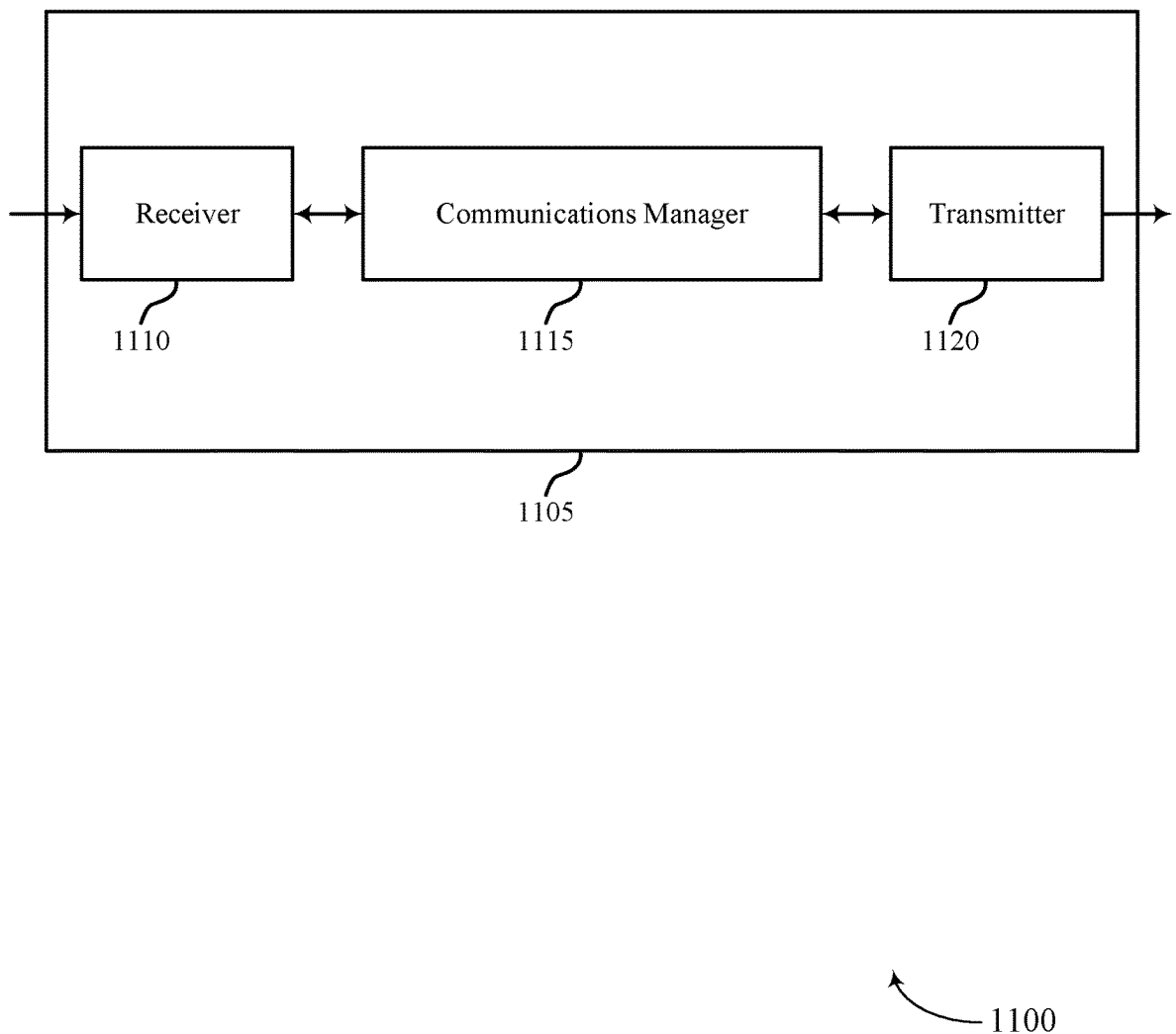
FIGS. 11 and 12 show block diagrams of devices that support methods for self-interference and cross-link interference measurements in mmW bands in accordance with aspects of the present disclosure.

FIG. 11 shows a block diagram 1100 of a device 1105 that supports methods for self-interference and cross-link interference measurements in mmW bands in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to methods for self-interference and cross-link interference measurements in mmW bands, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configure a first slot format at the first UE with the first SFI and a second slot format at the second UE with the second SFI, and receive a measurement report for one or more of the first UE or the second UE, the measurement report indicating one or more interference measurements according to the first SFI or the second SFI. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
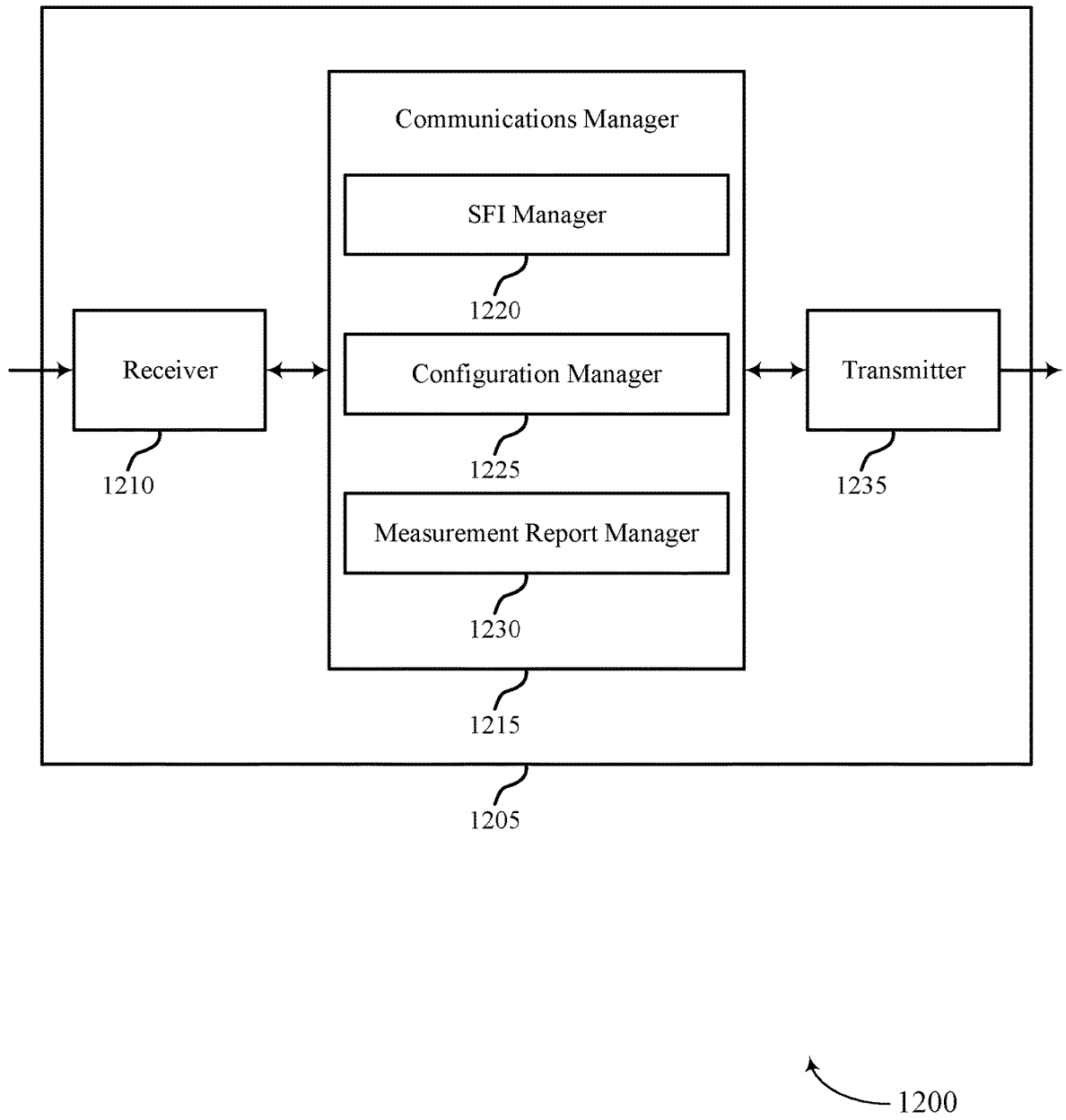

FIG. 12 shows a block diagram 1200 of a device 1205 that supports methods for self-interference and cross-link interference measurements in mmW bands in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to methods for self-interference and cross-link interference measurements in mmW bands, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include an SFI manager 1220, a configuration manager 1225, and a measurement report manager 1230. The communications manager 1215 may be an example of aspects of the communications manager 1410 described herein.

The SFI manager 1220 may select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE.

The configuration manager 1225 may configure a first slot format at the first UE with the first SFI and a second slot format at the second UE with the second SFI.

The measurement report manager 1230 may receive a measurement report for one or more of the first UE or the second UE, the measurement report indicating one or more interference measurements according to the first SFI or the second SFI.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
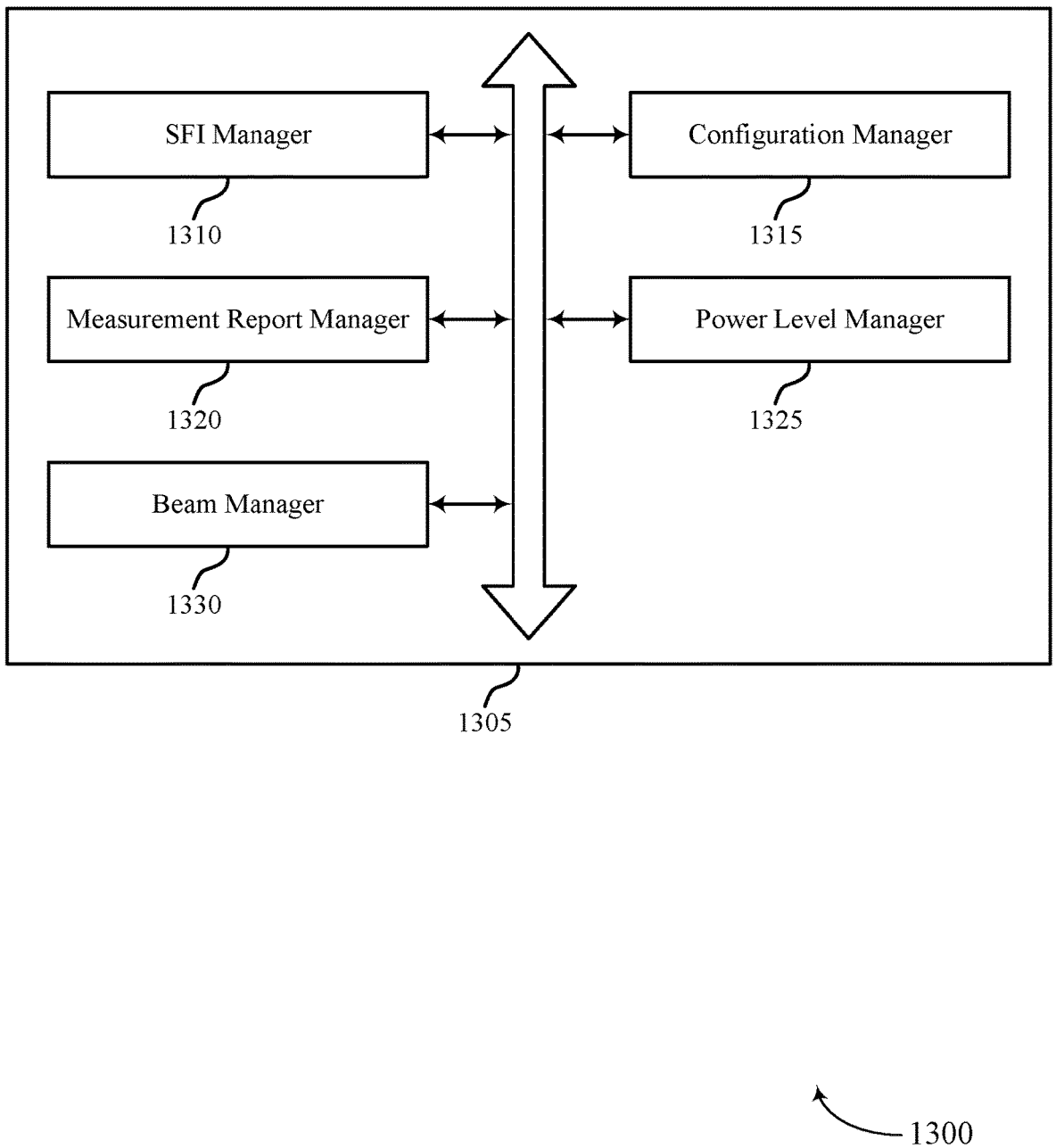
FIG. 13 shows a block diagram of a communications manager that supports methods for self-interference and cross-link interference measurements in mmW bands in accordance with aspects of the present disclosure.

FIG. 13 shows a block diagram 1300 of a communications manager 1305 that supports methods for self-interference and cross-link interference measurements in mmW bands in accordance with aspects of the present disclosure. The communications manager 1305 may be an example of aspects of a communications manager 1115, a communications manager 1215, or a communications manager 1410 described herein. The communications manager 1305 may include an SFI manager 1310, a configuration manager 1315, a measurement report manager 1320, a power level manager 1325, and a beam manager 1330. Each of these modules may communicate, directly or indirectly, with one another (e.g., via one or more buses).

The SFI manager 1310 may select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE. In some cases, a first symbol of each of the first SFI and the second SFI are configured to be downlink symbols with each of the first UE and the second UE receiving information from the base station during the first symbol. In some cases, a second symbol of the first UE is configured for uplink transmissions from the first UE and the second UE is configured for downlink receptions during the second symbol.

The configuration manager 1315 may configure a first slot format at the first UE with the first SFI and a second slot format at the second UE with the second SFI. In some examples, the configuration manager 1315 may configure either the uplink transmissions or the downlink receptions in the first or the second symbols at the first or the second UE via a reconfiguration of a flexible or a gap symbol. In some cases, the second UE is configured to measure interference from concurrent transmissions from the first UE and the base station during the second symbol relative to a baseline case of downlink reception from the base station alone during the first symbol.

In some cases, a number of symbols or slots over which the first SFI and second SFI are configured for cross-link interference measurements is based on an SCS of the first UE or the second UE. In some cases, a number of symbols or slots over which the first SFI and second SFI are configured for cross-link interference measurements is based on an interference estimation quality associated with the measurement report. In some cases, the interference estimation quality is a band-specific, bandwidth part-specific, or link-specific estimation quality. In some cases, the first UE and the second UE are a same UE, and where the first carrier uses a first frequency band and the second carrier uses a second frequency band that is different than the first frequency band.

The measurement report manager 1320 may receive a measurement report for one or more of the first UE or the second UE, the measurement report indicating one or more interference measurements according to the first SFI or the second SFI. In some examples, the measurement report indicates a cross-link interference measurement of the first UE based on a difference in measurements between the first symbol and the second symbol. In some examples, the measurement report manager 1320 may receive, from one or more of the first UE or the second UE, a request to perform an interference measurement for one or more SFIs, and where the selecting and the configuring are performed responsive to the request. In some cases, the measurement report is received from the second UE and provides one or more of an indication of a set of compatible SFIs based on interference measurements at the second UE, a first interference estimate associated with a first symbol of a slot during which the first UE does not transmit, a second interference estimate associated with a second symbol of the slot during which the first UE transmits an uplink communication, or any combinations thereof.

The power level manager 1325 may set power levels for measurement symbols such that consistent interference measurements are provided. In some cases, a power level at the first UE is configured based on the first SFI being selected for compatibility for measuring interference between the first UE and the second UE.

The beam manager 1330 may identify beam pairs and beamforming parameters of the first UE and the second UE to provide consistent transmissions at least during portions of the first SFI and the second SFI that are to be used for measuring cross-link interference between the first UE and the second UE.

Figure 14:
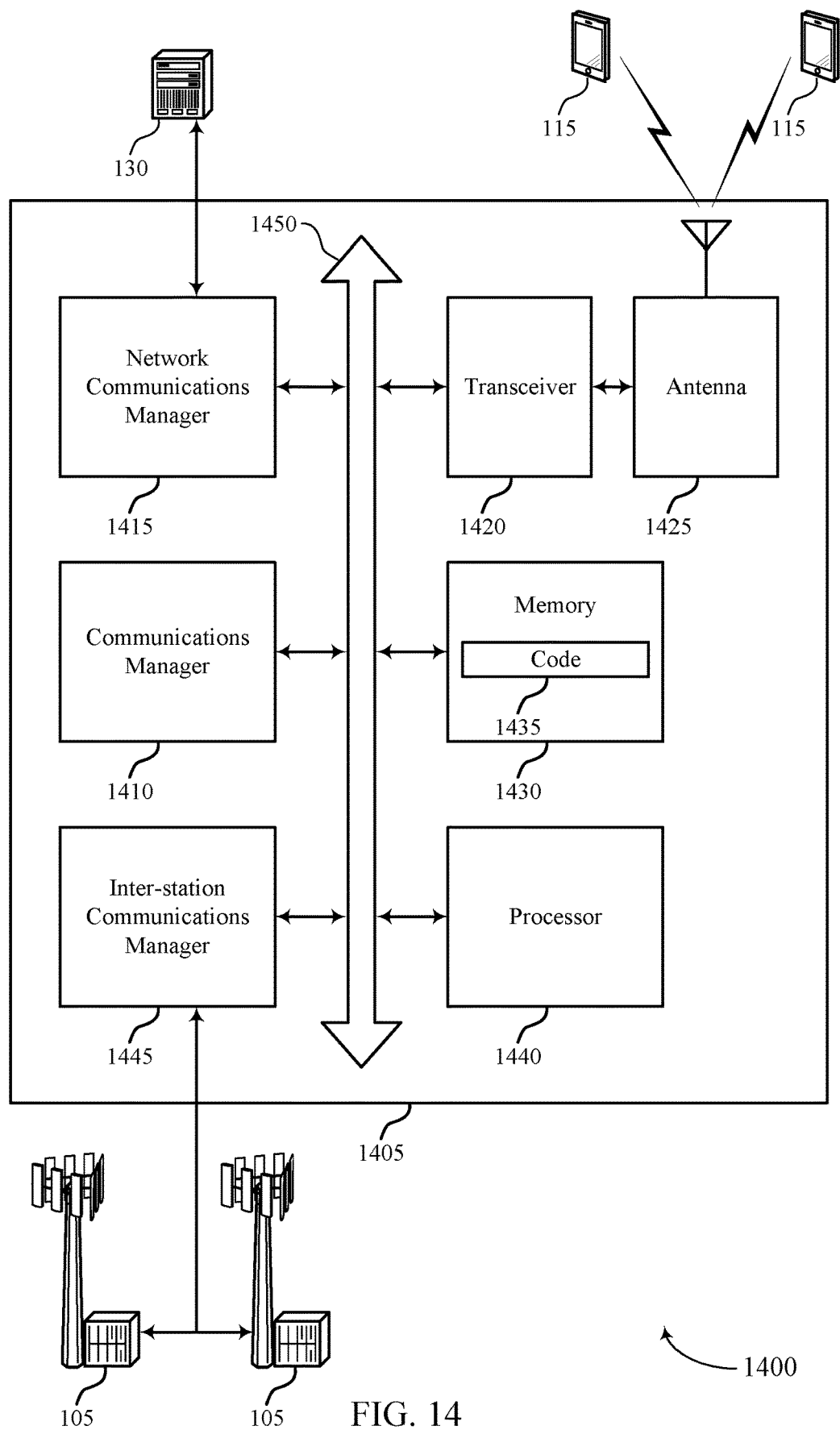
FIG. 14 shows a diagram of a system including a device that supports methods for self-interference and cross-link interference measurements in mmW bands in accordance with aspects of the present disclosure.

FIG. 14 shows a diagram of a system 1400 including a device 1405 that supports methods for self-interference and cross-link interference measurements in mmW bands in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE, configure a first slot format at the first UE with the first SFI and a second slot format at the second UE with the second SFI, and receive a measurement report for one or more of the first UE or the second UE, the measurement report indicating one or more interference measurements according to the first SFI or the second SFI.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting methods for self-interference and cross-link interference measurements in mmW bands).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
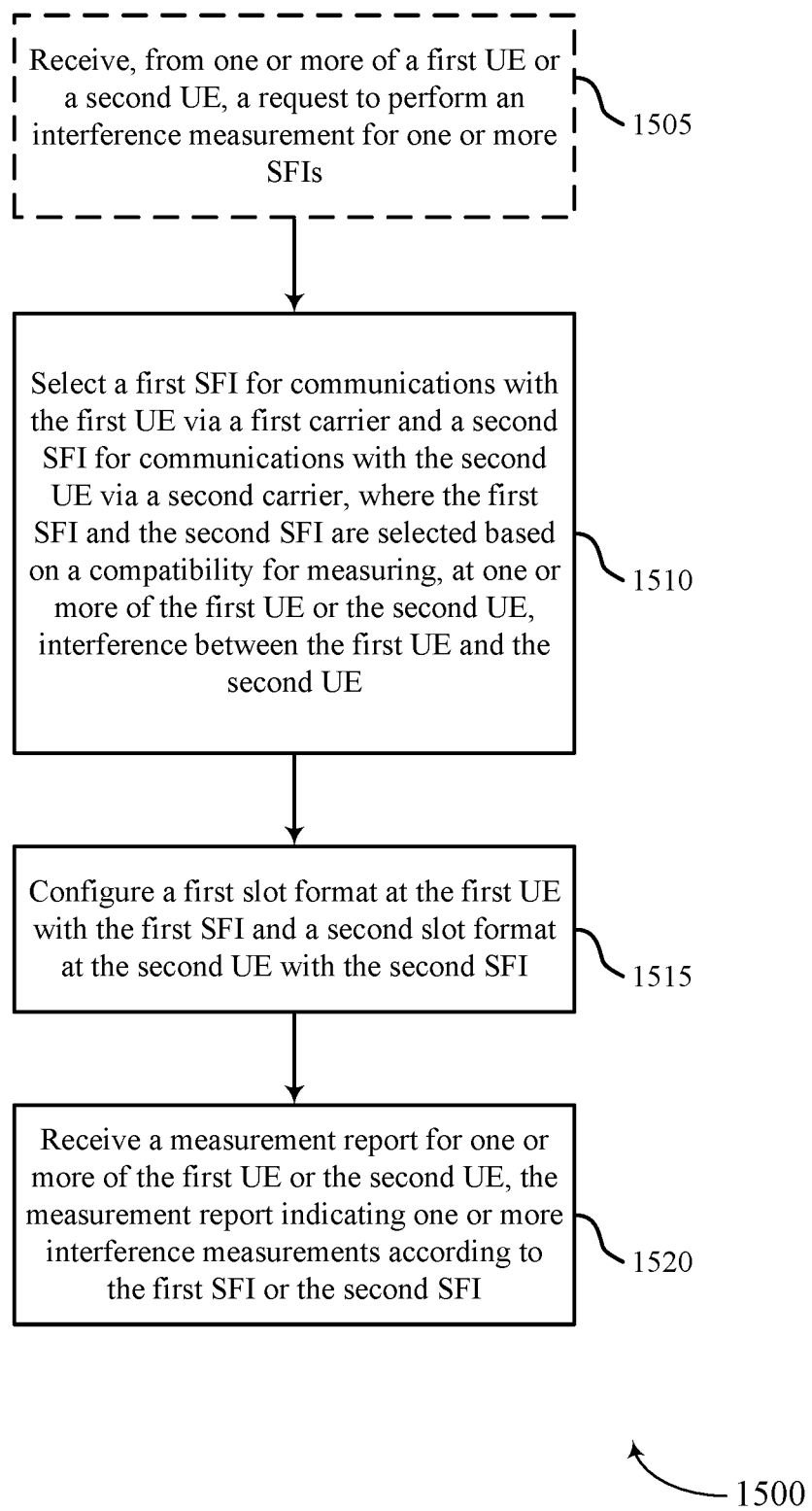
FIGS. 15 through 17 show flowcharts illustrating methods that support methods for self-interference and cross-link interference measurements in mmW bands in accordance with aspects of the present disclosure.

FIG. 15 shows a flowchart illustrating a method 1500 that supports methods for self-interference and cross-link interference measurements in mmW bands in accordance with aspects of the present disclosure. The operations of method 1500 may be implemented by a base station 105 or its components as described herein. For example, the operations of method 1500 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

Optionally, at 1505, the base station may receive, from one or more of a first UE or a second UE, a request to perform an interference measurement for one or more SFIs. The operations of 1505 may be performed according to the methods described herein. In some examples, aspects of the operations of 1505 may be performed by a measurement report manager as described with reference to FIGS. 11 through 14.

At 1510, the base station may select a first SFI for communications with the first UE via a first carrier and a second SFI for communications with the second UE via a second carrier, where the first SFI and the second SFI are selected based on a compatibility for measuring, at one or more of the first UE or the second UE, interference between the first UE and the second UE. The operations of 1510 may be performed according to the methods described herein. In some examples, aspects of the operations of 1510 may be performed by an SFI manager as described with reference to FIGS. 11 through 14. In some examples, the selecting is performed responsive to the request.

At 1515, the base station may configure a first slot format at the first UE with the first SFI and a second slot format at the second UE with the second SFI. The operations of 1515 may be performed according to the methods described herein. In some examples, aspects of the operations of 1515 may be performed by a configuration manager as described with reference to FIGS. 11 through 14. In some examples, the configuring is performed responsive to the request.

At 1520, the base station may receive a measurement report for one or more of the first UE or the second UE, the measurement report indicating one or more interference measurements according to the first SFI or the second SFI. The operations of 1520 may be performed according to the methods described herein. In some examples, aspects of the operations of 1520 may be performed by a measurement report manager as described with reference to FIGS. 11 through 14.

Figure 16:
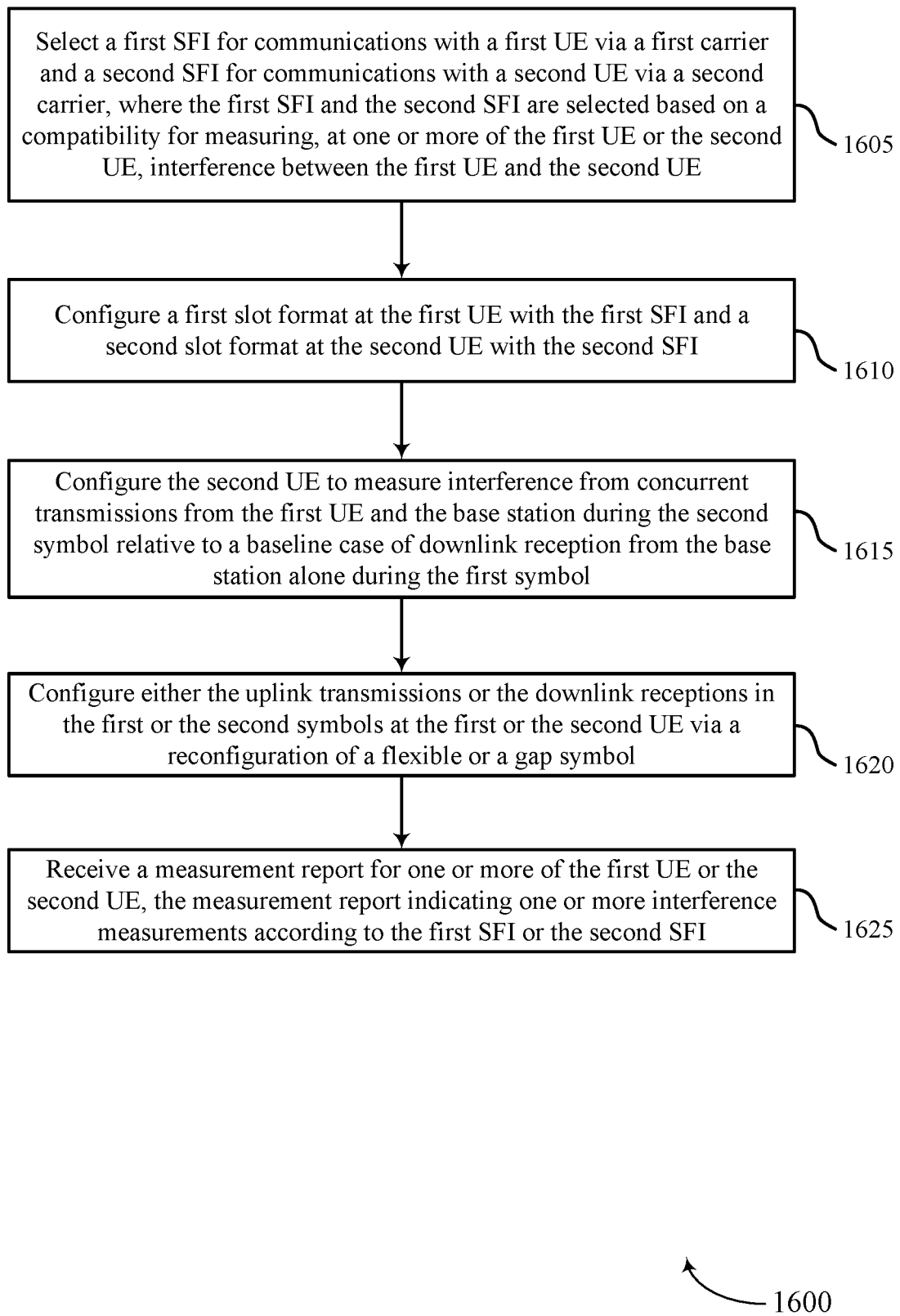

FIG. 16 shows a flowchart illustrating a method 1600 that supports methods for self-interference and cross-link interference measurements in mmW bands in accordance with aspects of the present disclosure. The operations of method 1600 may be implemented by a base station 105 or its components as described herein. For example, the operations of method 1600 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1605, the base station may select a first SFI for communications with a first UE via a first carrier and a second SFI for communications with a second UE via a second carrier, where the first SFI and the second SFI are selected based on a compatibility for measuring, at one or more of the first UE or the second UE, interference between the first UE and the second UE. The operations of 1605 may be performed according to the methods described herein. In some examples, aspects of the operations of 1605 may be performed by an SFI manager as described with reference to FIGS. 11 through 14.

At 1610, the base station may configure a first slot format at the first UE with the first SFI and a second slot format at the second UE with the second SFI. The operations of 1610 may be performed according to the methods described herein. In some examples, aspects of the operations of 1610 may be performed by a configuration manager as described with reference to FIGS. 11 through 14. In some cases, a first symbol of each of the first SFI and the second SFI are configured to be downlink symbols with each of the first UE and the second UE receiving information from the base station during the first symbol. In some cases, a second symbol of the first UE is configured for uplink transmissions from the first UE and the second UE is configured for downlink receptions during the second symbol.

At 1615, the base station may configure the second UE to measure interference from concurrent transmissions from the first UE and the base station during the second symbol relative to a baseline case of downlink reception from the base station alone during the first symbol. The operations of 1615 may be performed according to the methods described herein. In some examples, aspects of the operations of 1615 may be performed by a configuration manager as described with reference to FIGS. 11 through 14.

At 1620, the base station may configure either the uplink transmissions or the downlink receptions in the first or the second symbols at the first or the second UE via a reconfiguration of a flexible or a gap symbol. The operations of 1620 may be performed according to the methods described herein. In some examples, aspects of the operations of 1620 may be performed by a configuration manager as described with reference to FIGS. 11 through 14.

At 1625, the base station may receive a measurement report for one or more of the first UE or the second UE, the measurement report indicating one or more interference measurements according to the first SFI or the second SFI. The operations of 1625 may be performed according to the methods described herein. In some examples, aspects of the operations of 1625 may be performed by a measurement report manager as described with reference to FIGS. 11 through 14. In some cases, the measurement report indicates a cross-link interference measurement of the first UE based on a difference in measurements between the first symbol and the second symbol.

Figure 17:
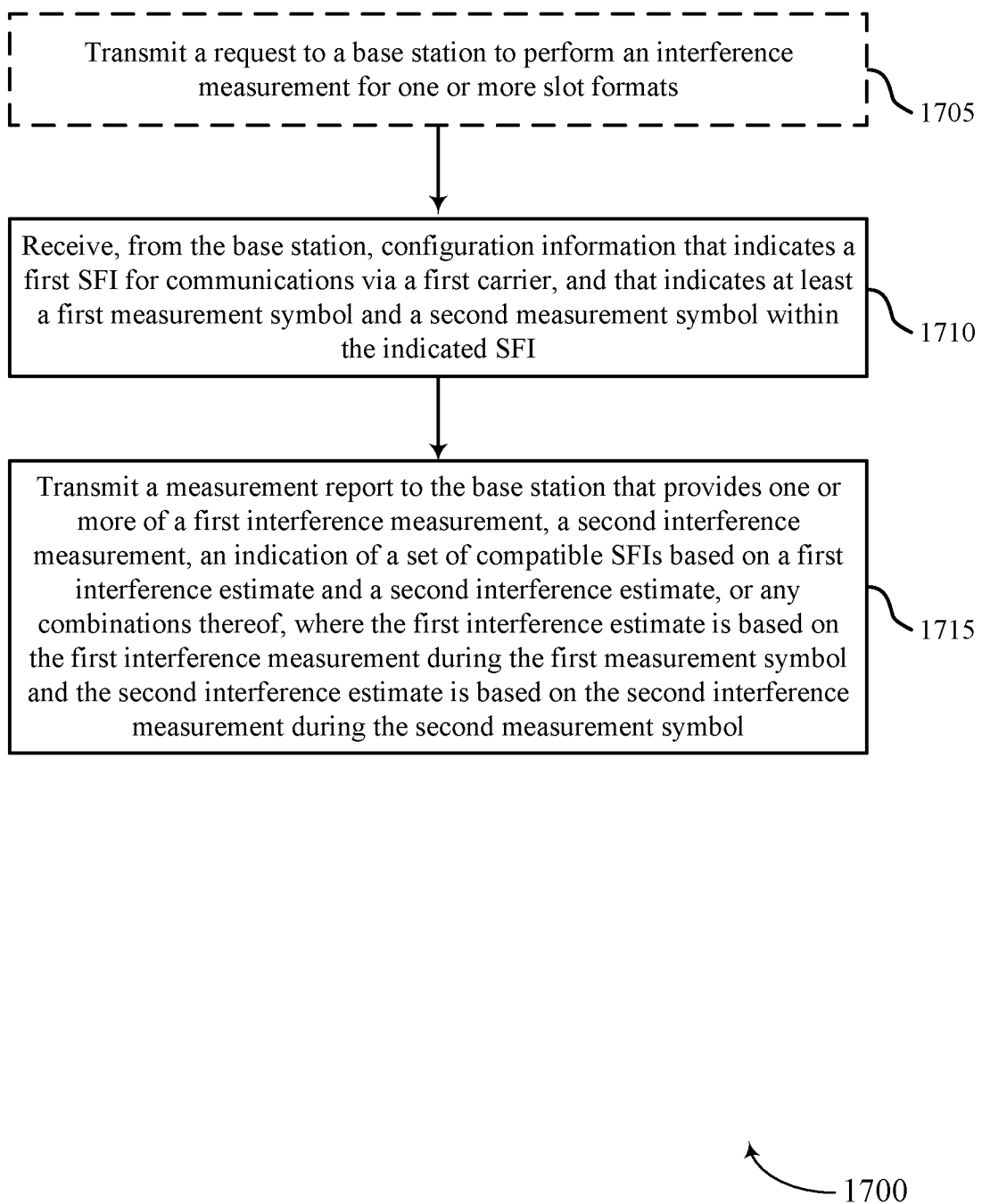

FIG. 17 shows a flowchart illustrating a method 1700 that supports methods for self-interference and cross-link interference measurements in mmW bands in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

Optionally, at 1705, the UE may transmit a request to a base station to perform an interference measurement for one or more slot formats. The operations of 1705 may be performed according to the methods described herein. In some examples, aspects of the operations of 1705 may be performed by a measurement report manager as described with reference to FIGS. 7 through 10.

At 1710, the UE may receive, from the base station, configuration information that indicates a first SFI for communications via a first carrier, and that indicates at least a first measurement symbol and a second measurement symbol within the indicated SFI. The operations of 1710 may be performed according to the methods described herein. In some examples, aspects of the operations of 1710 may be performed by a configuration manager as described with reference to FIGS. 7 through 10. In some examples, the configuration information is received responsive to the request.

At 1715, the UE may transmit a measurement report to the base station that provides one or more of a first interference measurement, a second interference measurement, an indication of a set of compatible SFIs based on a first interference estimate and a second interference estimate, or any combinations thereof, where the first interference estimate is based on the first interference measurement during the first measurement symbol and the second interference estimate is based on the second interference measurement during the second measurement symbol. The operations of 1715 may be performed according to the methods described herein. In some examples, aspects of the operations of 1715 may be performed by a measurement report manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a base station, comprising: selecting a first SFI for communications with a first UE via a first carrier and a second SFI for communications with a second UE via a second carrier, wherein the first SFI and the second SFI are selected based at least in part on a compatibility for measuring, at one or more of the first UE or the second UE, interference between the first UE and the second UE; configuring a first slot format at the first UE with the first SFI and a second slot format at the second UE with the second SFI; and receiving a measurement report for one or more of the first UE or the second UE, the measurement report indicating one or more interference measurements according to the first SFI or the second SFI.

Aspect 2: The method of aspect 1, wherein a first symbol of each of the first SFI and the second SFI are configured to be downlink symbols with each of the first UE and the second UE receiving information from the base station during the first symbol; a second symbol of the first UE is configured for uplink transmissions from the first UE and the second UE is configured for downlink receptions during the second symbol; and the second UE is configured to measure interference from concurrent transmissions from the first UE and the base station during the second symbol relative to a baseline case of downlink reception from the base station alone during the first symbol.

Aspect 3: The method of aspect 2, further comprising: configuring either the uplink transmissions or the downlink receptions in the first or the second symbols at the first or the second UE via a reconfiguration of a flexible or a gap symbol; and wherein the measurement report indicates a cross-link interference measurement of the first UE based at least in part on a difference in measurements between the first symbol and the second symbol.

Aspect 4: The method of any of aspects 1 through 3, wherein beamforming parameters of the first UE and the second UE are configured to be the same at least during portions of the first SFI and the second SFI that are to be used for measuring cross-link interference between the first UE and the second UE.

Aspect 5: The method of any of aspects 1 through 4, wherein a number of symbols or slots over which the first SFI and the second SFI are configured for cross-link interference measurements is based at least in part on a SCS of the first UE or the second UE.

Aspect 6: The method of any of aspects 1 through 5, wherein a number of symbols or slots over which the first SFI and the second SFI are configured for cross-link interference measurements is based at least in part on an interference estimation quality associated with the measurement report.

Aspect 7: The method of aspect 6, wherein the interference estimation quality is a band-specific, bandwidth part-specific, or link-specific estimation quality.

Aspect 8: The method of any of aspects 1 through 7, wherein a power level at the first UE is configured based at least in part on the first SFI being selected for compatibility for measuring interference between the first UE and the second UE.

Aspect 9: The method of any of aspects 1 through 8, further comprising: receiving, from one or more of the first UE or the second UE, a request to perform an interference measurement for one or more SFIs, and wherein the selecting and the configuring are performed responsive to the request.

Aspect 10: The method of aspect 9, wherein the measurement report is received from the second UE and provides one or more of an indication of a set of compatible SFIs based on interference measurements at the second UE, a first interference estimate associated with a first symbol of a slot during which the first UE does not transmit, a second interference estimate associated with a second symbol of the slot during which the first UE transmits an uplink communication, or any combinations thereof.

Aspect 11: The method of any of aspects 1 through 10, wherein the first UE and the second UE are a same UE, and the first carrier uses a first frequency band and the second carrier uses a second frequency band that is different than the first frequency band.

Aspect 12: A method for wireless communication at a second UE, comprising: receiving, from a base station, configuration information that indicates a first SFI for communications via a first carrier, and that indicates at least a first measurement symbol and a second measurement symbol within the indicated SFI; and transmitting a measurement report to the base station that provides one or more of a first interference measurement, a second interference measurement, an indication of a set of compatible SFIs based at least in part on a first interference estimate and a second interference estimate, or any combinations thereof, wherein the first interference estimate is based at least in part on the first interference measurement during the first measurement symbol and the second interference estimate is based at least in part on the second interference measurement during the second measurement symbol.

Aspect 13: The method of aspect 12, wherein the first measurement symbol is configured to be a downlink symbol for receiving information at the second UE from the base station during the first measurement symbol; the second measurement symbol is configured for uplink transmissions at a first UE and is configured to be a downlink symbol for receiving information from the base station at the second UE; and the measurement report indicates interference from concurrent transmissions from the first UE and the base station during the second measurement symbol relative to a baseline case of downlink reception from the base station alone during the first measurement symbol.

Aspect 14: The method of aspect 13, further comprising: receiving, from the base station, further configuration information that configures either the uplink transmissions or downlink receptions in the first or the second measurement symbols via a reconfiguration of a flexible or a gap symbol; and wherein the measurement report indicates a cross-link interference measurement of the UE based at least in part on a difference in measurements between the first measurement symbol and the second measurement symbol.

Aspect 15: The method of any of aspects 12 through 14, wherein receive beamforming parameters of the second UE are configured to be the same at least during the first measurement symbol and the second measurement symbol.

Aspect 16: The method of any of aspects 12 through 15, wherein the measurement report indicates one or more of a set of SFIs that are compatible for communications with the second UE, a set of beam pairs that are compatible for communications with the second UE, or any combinations thereof.

Aspect 17: The method of any of aspects 12 through 16, wherein a number of symbols or slots over which the first SFI is configured for cross-link measurements is based at least in part on a SCS of the second UE.

Aspect 18: The method of any of aspects 12 through 17, wherein a number of symbols or slots over which the first SFI is configured for cross-link measurements is based at least in part on an interference estimation quality associated with the measurement report.

Aspect 19: The method of aspect 18, wherein the interference estimation quality is a band-specific, bandwidth part-specific or link-specific estimation quality.

Aspect 20: The method of any of aspects 12 through 19, further comprising: transmitting a request to the base station to perform an interference measurement for one or more slot formats, and wherein the configuration information is received responsive to the request.

Aspect 21: An apparatus for wireless communication at a base station, comprising a processor; memory coupled with the processor; and instructions stored in the memory and executable by the processor to cause the apparatus to perform a method of any of aspects 1 through 11.

Aspect 22: An apparatus for wireless communication at a base station, comprising at least one means for performing a method of any of aspects 1 through 11.

Aspect 23: A non-transitory computer-readable medium storing code for wireless communication at a base station, the code comprising instructions executable by a processor to perform a method of any of aspects 1 through 11.

Aspect 24: An apparatus for wireless communication at a second UE, comprising a processor; memory coupled with the processor; and instructions stored in the memory and executable by the processor to cause the apparatus to perform a method of any of aspects 12 through 20.

Aspect 25: An apparatus for wireless communication at a second UE, comprising at least one means for performing a method of any of aspects 12 through 20.

Aspect 26: A non-transitory computer-readable medium storing code for wireless communication at a second UE, the code comprising instructions executable by a processor to perform a method of any of aspects 12 through 20

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
   selecting a first slot format index (SFI) for communications with a first user equipment (UE) via a first carrier and a second SFI for communications with a second UE via a second carrier, wherein the first SFI and the second SFI are selected based at least in part on a compatibility for measuring, at one or more of the first UE or the second UE, interference between the first UE and the second UE;
   configuring a first slot format at the first UE with the first SFI and a second slot format at the second UE with the second SFI, wherein:
   a first symbol of each of the first SFI and the second SFI are configured to be downlink symbols with each of the first UE and the second UE receiving information from the base station during the first symbol;
   a second symbol of the first UE is configured for uplink transmissions from the first UE and the second UE is configured for downlink receptions during the second symbol; and
   the second UE is configured to measure interference from concurrent transmissions from the first UE and the base station during the second symbol relative to a baseline case of downlink reception from the base station alone during the first symbol; and
   receiving a measurement report for one or more of the first UE or the second UE, the measurement report indicating one or more interference measurements according to the first SFI or the second SFI.

2. The method of claim 1, further comprising:
   configuring either the uplink transmissions or the downlink receptions in the first or the second symbols at the first or the second UE via a reconfiguration of a flexible or a gap symbol; and
   wherein the measurement report indicates a cross-link interference measurement of the first UE based at least in part on a difference in measurements between the first symbol and the second symbol.

3. The method of claim 1, wherein
   beamforming parameters of the first UE and the second UE are configured to be the same at least during portions of the first SFI and the second SFI that are to be used for measuring cross-link interference between the first UE and the second UE.

4. The method of claim 1, wherein a number of symbols or slots over which the first SFI and the second SFI are configured for cross-link interference measurements is based at least in part on a sub-carrier spacing (SCS) of the first UE or the second UE.

5. The method of claim 1, wherein a number of symbols or slots over which the first SFI and the second SFI are configured for cross-link interference measurements is based at least in part on an interference estimation quality associated with the measurement report.

6. The method of claim 5, wherein the interference estimation quality is a band-specific, bandwidth part-specific, or link-specific estimation quality.

7. The method of claim 1, wherein a power level at the first UE is configured based at least in part on the first SFI being selected for compatibility for measuring interference between the first UE and the second UE.

8. The method of claim 1, further comprising:
   receiving, from one or more of the first UE or the second UE, a request to perform an interference measurement for one or more SFIs, and wherein the selecting and the configuring are performed responsive to the request.

9. The method of claim 8, wherein the measurement report is received from the second UE and provides one or more of an indication of a set of compatible SFIs based on interference measurements at the second UE, a first interference estimate associated with a first symbol of a slot during which the first UE does not transmit, a second interference estimate associated with a second symbol of the slot during which the first UE transmits an uplink communication, or any combinations thereof.

10. The method of claim 1, wherein the first UE and the second UE are a same UE, and wherein the first carrier uses a first frequency band and the second carrier uses a second frequency band that is different than the first frequency band.

11. A method for wireless communication at a second user equipment (UE), comprising:
   receiving, from a base station, configuration information that indicates a first slot format index (SFI) for communications via a first carrier, and that indicates at least a first measurement symbol and a second measurement symbol within the indicated SFI; and
   transmitting a measurement report to the base station that provides one or more of a first interference measurement, a second interference measurement, an indication of a set of compatible SFIs based at least in part on a first interference estimate and a second interference estimate, or any combinations thereof, wherein the first interference estimate is based at least in part on the first interference measurement during the first measurement symbol and the second interference estimate is based at least in part on the second interference measurement during the second measurement symbol, wherein:

the first measurement symbol is configured to be a downlink symbol for receiving information at the second UE from the base station during the first measurement symbol;

the second measurement symbol is configured for uplink transmissions at a first UE and is configured to be a downlink symbol for receiving information from the base station at the second UE; and the measurement report indicates interference from concurrent transmissions from the first UE and the base station during the second measurement symbol relative to a baseline case of downlink reception from the base station alone during the first measurement symbol.

12. The method of claim 11, further comprising:
receiving, from the base station, further configuration information that configures either the uplink transmissions or downlink receptions in the first or the second measurement symbols via a reconfiguration of a flexible or a gap symbol; and
wherein the measurement report indicates a cross-link interference measurement of the UE based at least in part on a difference in measurements between the first measurement symbol and the second measurement symbol.

13. The method of claim 11, wherein
receive beamforming parameters of the second UE are configured to be the same at least during the first measurement symbol and the second measurement symbol.

14. The method of claim 11, wherein the measurement report indicates one or more of a set of SFIs that are compatible for communications with the second UE, a set of beam pairs that are compatible for communications with the second UE, or any combinations thereof.

15. The method of claim 11, wherein a number of symbols or slots over which the first SFI is configured for cross-link measurements is based at least in part on a sub-carrier spacing (SCS) of the second UE.

16. The method of claim 11, wherein a number of symbols or slots over which the first SFI is configured for cross-link measurements is based at least in part on an interference estimation quality associated with the measurement report.

17. The method of claim 16, wherein the interference estimation quality is a band-specific, bandwidth part-specific or link-specific estimation quality.

18. The method of claim 11, further comprising:
transmitting a request to the base station to perform an interference measurement for one or more slot formats, and wherein the configuration information is received responsive to the request.

19. An apparatus for wireless communication at a base station, comprising:
at least one processor; and
at least one memory coupled with the at least one processor, the at least one memory comprising instructions executable by the at least one processor to cause the apparatus to:
select a first slot format index (SFI) for communications with a first user equipment (UE) via a first carrier and a second SFI for communications with a second UE via a second carrier, wherein the first SFI and the second SFI are selected based at least in part on a compatibility for measuring, at one or more of the first UE or the second UE, interference between the first UE and the second UE;
configure a first slot format at the first UE with the first SFI and a second slot format at the second UE with the second SFI, wherein:
a first symbol of each of the first SFI and the second SFI are configured to be downlink symbols with each of the first UE and the second UE receiving information from the base station during the first symbol;
a second symbol of the first UE is configured for uplink transmissions from the first UE and the second UE is configured for downlink receptions during the second symbol; and
the second UE is configured to measure interference from concurrent transmissions from the first UE and the base station during the second symbol relative to a baseline case of downlink reception from the base station alone during the first symbol; and
receive a measurement report for one or more of the first UE or the second UE, the measurement report indicating one or more interference measurements according to the first SFI or the second SFI.

20. The apparatus of claim 19, wherein the instructions are further executable by the at least one processor to cause the apparatus to:
configure either the uplink transmissions or the downlink receptions in the first or the second symbols at the first or the second UE via a reconfiguration of a flexible or a gap symbol; and
wherein the measurement report indicates a cross-link interference measurement of the first UE based at least in part on a difference in measurements between the first symbol and the second symbol.

21. The apparatus of claim 19, wherein beamforming parameters of the first UE and the second UE are configured to be the same at least during portions of the first SFI and the second SFI that are to be used for measuring cross-link interference between the first UE and the second UE.

22. The apparatus of claim 19, wherein a number of symbols or slots over which the first SFI and the second SFI are configured for cross-link interference measurements is based at least in part on a sub-carrier spacing (SCS) of the first UE or the second UE.

23. The apparatus of claim 19, wherein a number of symbols or slots over which the first SFI and the second SFI are configured for cross-link interference measurements is based at least in part on an interference estimation quality associated with the measurement report.

24. An apparatus for wireless communication at a second user equipment (UE), comprising:
at least one processor; and
at least one memory coupled with the at least one processor, the at least one memory comprising instructions executable by the at least one processor to cause the apparatus to:
receive, from a base station, configuration information that indicates a first slot format index (SFI) for communications via a first carrier, and that indicates at least a first measurement symbol and a second measurement symbol within the indicated SFI; and
transmit a measurement report to the base station that provides one or more of a first interference measurement, a second interference measurement, an indication of a set of compatible SFIs based at least in part on a first interference estimate and a second interference estimate, or any combinations thereof, wherein the first interference estimate is based at least in part on the first interference measurement during the first measurement symbol and the second interference estimate is based at least in part on the second interference measurement during the second measurement symbol, wherein:

the first measurement symbol is configured to be a downlink symbol for receiving information at the second UE from the base station during the first measurement symbol;

the second measurement symbol is configured for uplink transmissions at a first UE and is configured to be a downlink symbol for receiving information from the base station at the second UE; and the measurement report indicates interference from concurrent transmissions from the first UE and the base station during the second measurement symbol relative to a baseline case of downlink reception from the base station alone during the first measurement symbol.

25. The apparatus of claim 24, wherein the instructions are further executable by the at least one processor to cause the apparatus to:

receive, from the base station, further configuration information that configures either the uplink transmissions or downlink receptions in the first or the second measurement symbols via a reconfiguration of a flexible or a gap symbol; and wherein the measurement report indicates a cross-link interference measurement of the UE based at least in part on a difference in measurements between the first measurement symbol and the second measurement symbol.

26. The apparatus of claim 24, wherein receive beamforming parameters of the second UE are configured to be the same at least during the first measurement symbol and the second measurement symbol.

* * * * *